(12) United States Patent
Thompson et al.

(10) Patent No.: US 9,290,273 B1
(45) Date of Patent: Mar. 22, 2016

(54) ADAPTIVE FREEZE, SNOW OR ICE PROTECTION SYSTEM AND METHOD

(71) Applicants: James C. Thompson, Half Moon Bay, CA (US); Chester L. Sandberg, Palo Alto, CA (US)

(72) Inventors: James C. Thompson, Half Moon Bay, CA (US); Chester L. Sandberg, Palo Alto, CA (US)

( * ) Notice: Subject to any disclaimer, the term of this patent is extended or adjusted under 35 U.S.C. 154(b) by 523 days.

(21) Appl. No.: 13/929,041

(22) Filed: Jun. 27, 2013

(51) Int. Cl.
*G05D 7/00* (2006.01)
*B64D 15/22* (2006.01)
*G05D 23/19* (2006.01)

(52) U.S. Cl.
CPC ............... *B64D 15/22* (2013.01); *G05D 23/19* (2013.01)

(58) Field of Classification Search
CPC ............................. G05D 23/19; B64D 15/22
USPC ........................................................ 700/282
See application file for complete search history.

(56) References Cited

U.S. PATENT DOCUMENTS

| | | | |
|---|---|---|---|
| 4,081,657 A | 3/1978 | Stanford | |
| 4,216,554 A | 8/1980 | Glueckert et al. | |
| 5,391,858 A | 2/1995 | Tourangeau et al. | |
| 5,763,858 A * | 6/1998 | Jones | B64D 15/22 219/213 |
| 5,900,178 A | 5/1999 | Johnsen | |
| 6,263,260 B1 | 7/2001 | Bodmer et al. | |
| 6,912,429 B1 | 6/2005 | Bilger | |
| 6,915,959 B2 * | 7/2005 | Jones | G05D 23/1919 219/483 |
| 7,014,357 B2 * | 3/2006 | Severson | B64D 15/20 374/148 |
| 7,523,889 B2 * | 4/2009 | Bourjac et al. | B64D 15/12 244/134 D |

* cited by examiner

*Primary Examiner* — Crystal J Barnes-Bullock
*Assistant Examiner* — Sivalingham Sivanesan
(74) *Attorney, Agent, or Firm* — Head, Johnson & Kachigian, P.C.

(57) ABSTRACT

Invention is an adaptive freeze, snow or ice protection system and method of operation that comprises an integrated expert system control module, a sensing means, a heating means, a control system means, an interconnection means and an energy supply system means where the protection system is supplied with an external energy source. The integrated expert system control module has a learning algorithm that performs adaptive analysis using input from conventional and unique sensors as the sensing means, other available inputs and other available data to monitor all of the systems of the protection system and provides commands to control all the systems of the protection system that manage the possible effects of predetermined environmental conditions on facilities or equipment.

42 Claims, 13 Drawing Sheets

ADAPTIVE FREEZE, SNOW OR ICE PROTECTION SYSTEM AND METHOD

FIELD OF THE INVENTION

This invention relates generally to an adaptive freeze, snow or ice protection system and method of operation that employs conventional sensors, unique sensors, locally stored data, local inputs, data from remote sites, input from remote sites, heating systems, control systems, interconnection systems and energy supply systems. The protection system employs a learning algorithm to perform adaptive analysis using local data, local inputs, remote data and remote inputs to manage the energy supplied to the heating systems and to manage the control components used by the control systems to manage the possible consequences caused by freezing conditions, snowing conditions, icing conditions or any combination of these three conditions thereof on facilities, equipment or the safety of individuals.

DESCRIPTION OF THE RELATED ART

Cold weather brings about freezing conditions, snowing conditions, icing conditions or any combination of these three conditions thereof which will be referred to hereinafter as "environmental conditions". These environmental conditions can cause safety issues for individuals and damage to facilities or equipment.

In the past, several types of heaters such as electric heating cable, steam heat tracing and hydronic heating have been employed to mitigate possible safety issues and damage to facilities or equipment due to these environmental conditions. Freezing pipes, slippery stairs and sidewalks, dangerous icicles and ice dams are just a few of the problems that can occur. Each of the hazards has been mitigated using unique approaches. Standards for these approaches are defined in Chapter 50 of American Society of Heating, Refrigerating and Air-Conditioning Engineers 2007 HVAC Applications Handbook.

Ice and snow on driveways, stairs, ramps, etc. are safety issues. Hydronic and electric systems have been widely employed to melt ice and snow. These systems are often activated manually or by a sensor that detects when a predetermined condition exists. For example, systems are activated by a snow sensor that detects when snow is present. Many types of ice detectors have been developed over the years to detect ice forming on wings or on ship decks or on roadways. Unfortunately, these detectors work only after snow or ice has begun to form. To ideally melt snow on pavement, for instance, it would be important to preheat the surface and some distance below the grade so the snow would melt as soon as it falls and ice would be prevented from forming on the surface. Another problem with these pavement systems is that they will not activate if ice forms from water running on the surface and freezing. Lastly, there is no way of proportioning the heat to the rate of snowfall. So these systems are designed and operated for maximum snowfall loads which waste energy when the snowfall load is light.

Snow falling on a roof presents other unique problems. As heat from the building conducts up through the roof and as solar heating occurs from above during the daytime, the snow on the roof begins to melt. As the water from the melted snow runs down the roof, it flows to the cold area of the overhang. Ice dams can form along with icicles at the roof's edge. Ice dams can cause damage to the roof and cause water to leak into the structure. The greater concern is that the ice dam and/or icicles may fall from the roof and injure people below.

Many types of ice dam prevention systems and/or roof edge heating systems have been employed. These systems often use a snow sensor as described above, a gutter sensor (similar to a snow sensor but lying in the gutter), a temperature sensor or manual controls. The snow sensor may work if it is laid in a gutter or at the drip edge, but it is subject to corrosion and contamination by leaves or dirt. The temperature sensor approach will work but will turn the system on when no ice or snow is present which wastes energy.

Below freezing temperatures can lead to frozen water pipes that can burst. Non-water fluids will increase in viscosity as the temperature drops and become difficult or impossible to pump. The traditional approach has been to use steam or electric heating cable to keep the fluid warm. Electric heating cable is the preferred choice for water lines and sensitive fluids. The electric heating cable is sized to heat the fluid to the desired temperature on the coldest day recorded. Unfortunately for most water lines, the electric heating cable is controlled by an ambient thermostat. When the temperature approaches freezing, the system is turned on to full power. This will heat the water well above freezing and waste energy. A thermostat that senses a pipe's temperature will save energy but requires a much more complex circuit design that controls every possible flow-path separately. If the power is lost, electric heating cables will not prevent freezing of the water and possible bursting of the water pipes. Often when a building is not in use for a long period and to deal with the possibility of a power loss and resultant freezing, the building's water supply is turned off and the water system is completely drained. This shutdown is generally done manually by a series of valves. However, if the power failure occurs when no building shutdown was planned, serious damage can occur from water pipes bursting and portions of the building flooding. Automatic shut off and drainage systems have been proposed in the past, but they lacked remote control and monitoring.

Automated irrigation systems exist that use soil sensors to control the amount of water used. Those soil sensors only work well if the sensors are placed correctly. Photovoltaic sensors and timers generally control decorative lighting, but have a history of failing. Often the irrigation systems and decorative lighting systems continue to operate during periods of freezing, snowing or icing conditions which create additional hazards to individuals.

Most of the systems used to respond to periods of freezing, snowing or icing conditions described herein are individual systems. Although they often rely on the same information (examples: ambient temperature and moisture), they are not integrated and cannot be monitored or managed remotely.

What is needed is a protection system that provides both predictive and real time responses to predetermined environmental conditions using an adaptive analysis approach such that the protection system learns from past responses in order to reduce energy costs by responding to predetermined environmental conditions or predicted predetermined environmental conditions.

It is therefore desirable to provide a cost effective protection system that incorporates the elements of sensing, analyzing and responding to predetermined environmental conditions using an adaptive analysis approach.

It is further desirable to provide a protection system that provides both predictive and real time responses to predetermined environmental conditions using a learning algorithm to perform an adaptive analysis to respond to predetermined environmental conditions or predicted predetermined environmental conditions.

It is further desirable to provide a protection system where the decision algorithm would use data provided to determine the beginning and/or ending of winter to manage its response to predetermined environmental conditions or predicted predetermined environmental conditions.

It is further desirable to provide a protection system where the decision algorithm would use local data, local input, remote data and remote input to manage its response to predetermined environmental conditions or predicted predetermined environmental conditions.

It is still further desirable to provide a protection system where the decision algorithm would use predictive meteorological inputs to manage its response to expected predetermined environmental conditions.

It is still further desirable to provide a protection system that uses an optical detection system to detect predetermined environmental conditions.

It is still further desirable to provide a protection system that interfaces with a dedicated building management system to receive inputs, provide data and issue commands between the protection system and the building management system so that the building and surrounding grounds are protected when a predetermined environmental condition occurs or is predicted to occur. Expected responses would be to initiate and/or shut off irrigation systems, decorative lighting, block water sources and drain water piping.

It is still further desirable to provide a protection system that integrates all elements required to protect facilities, equipment and people from predetermined environmental conditions or predicted predetermined environmental conditions.

It is still further desirable to provide a protection system that uses an electric heating cable system as its heat source for responding to predetermined environmental conditions or predicted predetermined environmental conditions.

It is still further desirable to provide a protection system that uses a hydronic heating system as its heat source for responding to predetermined environmental conditions or predicted predetermined environmental conditions.

It is still further desirable to provide a protection system that uses a gas infrared heating system as its heat source for responding to predetermined environmental conditions or predicted predetermined environmental conditions.

It is still further desirable to provide a protection system that uses a wireless system for its communication of inputs and data for sensing, analyzing and responding to predetermined environmental conditions or predicted predetermined environmental conditions.

It is still further desirable to provide a protection system that provides reports and warning notifications to an operator and that allows an operator to manage or override the protection system.

It is still further desirable to provide a protection system that uses an electric infrared heating system as its heat source for responding to predetermined environmental conditions or predicted predetermined environmental conditions.

SUMMARY OF THE INVENTION

The present invention provider an adaptive freeze, snow or ice protection system and protection system method of operation for sensing, analyzing and responding to predetermined environmental conditions or to the prediction of a predetermined environmental condition occurring within a predetermined time to protect facilities or equipment from the effects of predetermined environmental conditions.

The invention comprises an integrated expert system control module, a sensing means, a heating means, a control system means, an interconnection means and an energy supply system means where the protection system is supplied with an external energy source. The integrated expert system control module (referred to as either "system module" or "module" hereinafter) has a learning algorithm that employs input from conventional and unique sensors such as the sensing means, input from local sources, input from remote sources, stored data, local data and remote data to monitor all of the systems of the protection system and to provide commands to control all the systems of the protection system that manage the possible effects of predetermined environmental conditions or of a predicted predetermined environmental condition on facilities or equipment.

An advantage of the present invention is that the system module would be programmed to maximize the efficiency of the heating means by turning the heating means on at an optimum time and by proportioning the amount of energy used by the heating means to be sufficient for the task at hand.

Another advantage is that the sensors would feed necessary information into the system module which may interface with other building or facility management systems.

Another advantage is that this information would be stored in the system module to be used in the learning algorithm (learning expert system or simple predefined) to develop commands to control various heating means systems and control means systems.

Another advantage is that the system module could be remotely controlled and monitored.

Yet another advantage of the present invention is that the protection system would provide both predictive and real time responses to predetermined environmental conditions using a learning algorithm to perform an adaptive analysis to respond to predetermined environmental conditions or to a predicted predetermined environmental condition to provide a major reduction in energy usage.

Yet still another advantage of the present invention is to provide a protection system that integrates all elements required to provide desired protection from predetermined environmental conditions or predicted predetermined environmental conditions.

Yet still another advantage of the present invention is improved safety for facilities, equipment or individuals.

Other advantages and features will be apparent from the following description, and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
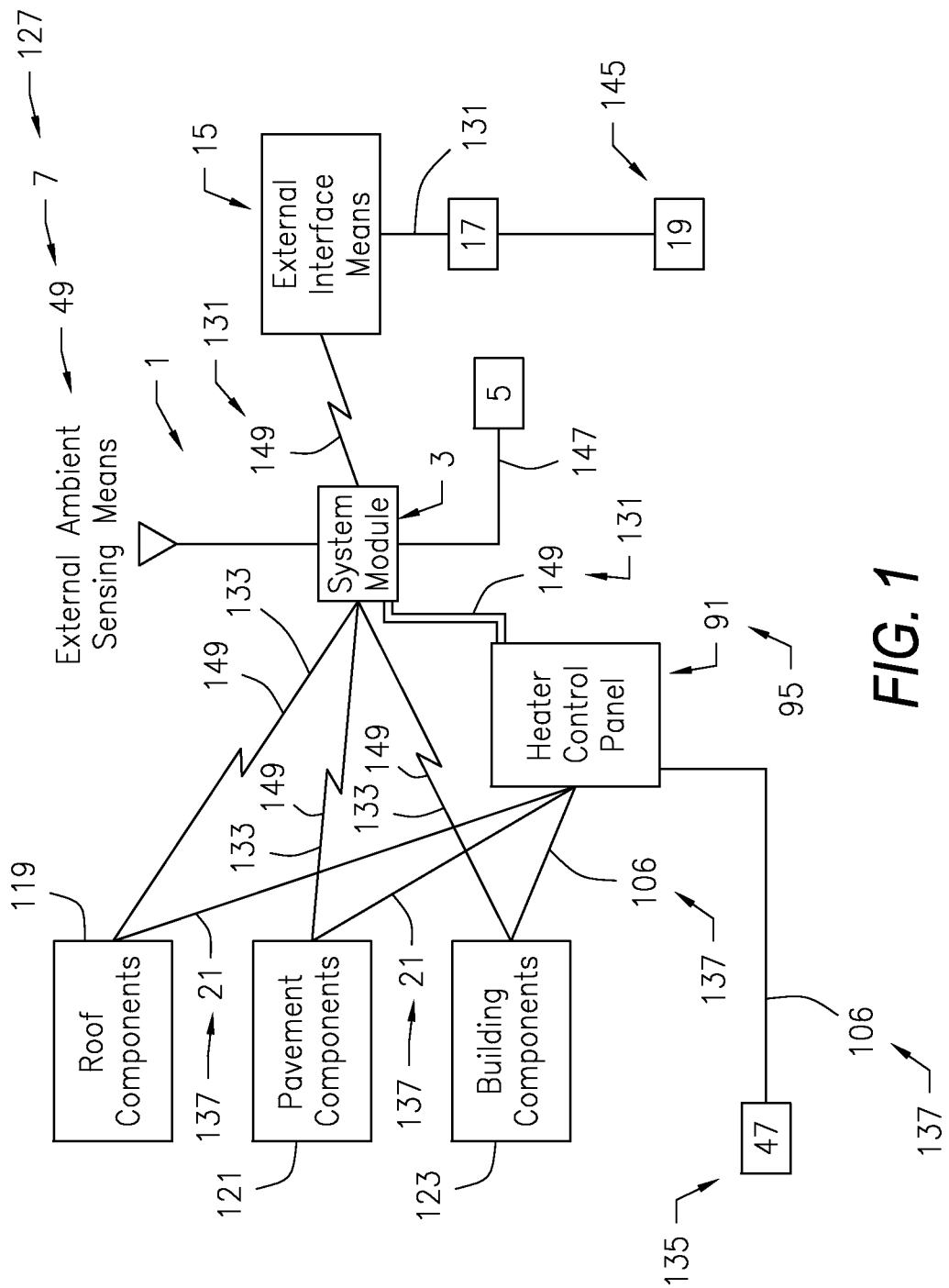
FIG. 1 is a schematic illustration of an embodiment of the overall adaptive freeze, snow or ice protection system of the present invention.

Referring now to FIGS. 1 through 10, wherein like numerals of reference designate like elements throughout the several views, and initially referring to FIG. 1, a schematic illustration of one embodiment of an adaptive freeze, snow or ice protection system 1 (referred to as "protection system" hereinafter). The embodiment of the protection system 1 shown in FIG. 1 is supplied with an external energy source 135 and with an external electrical control power source 5. As can be seen from embodiments shown in FIG. 5A, FIG. 5B, FIG. 5C, FIG. 5D, FIG. 6 and FIG. 7, the protection system 1 has a heating means 103. The heating means 103 is connected to the external energy source 135 by an energy supply system 137. The external energy source 135 provides the energy used by the heating means 103 to produce the heat that protects the facilities or equipment. The heating means 103 can be a hydronic heating system 111, an electrical heating system 104 or a gas heating system 211. The external energy source 135 can be a reservoir of heat transfer fluid 125 for the hydronic heating system 111, an external electrical heater power source 47 for the electrical heating system 104 or an external gas source 141 for the gas heating system 211. The energy supply system 137 can be a liquid piping system 117 for the hydronic heating system 111, a heater electric supply system 106 for the electrical heating system 104 or a gas piping system 219 for the gas heating system 211. The reservoir of heat transfer fluid 125 will be of predetermined quantity, pressure and temperature of any of the well known heat transfer liquids; and the liquid piping system 117 will be of predetermined size of any of the well known liquid piping systems to allow the heat transfer fluid 125 to circulate through the liquid piping system 117 to produce the heat that protects the facilities or equipment. In the preferred embodiment of the hydronic heating system 111, the reservoir of heat transfer fluid 125 comprises heated water mixed with anti-freeze chemicals and the liquid piping system 117 comprises a combination of piping, couplings, fittings and valves, suitable for liquid service, that are interconnected together create one continuous flow path. The external electrical heater power source 47 can be either a single phase or a three phase AC power source operating between 110 volts AC to 600 volts AC. The heater electric supply system 106 can be any of the well known electrical distribution system where the preferred embodiment of the heater electric supply system 106 further comprises a plurality of heater power cables 21 received inside a conduit system 22. The heater power cables 21 will be of predetermined size and quantity to provide the electrical energy used by the electrical heating system 104 to produce the heat that protects the facilities or equipment. The conduit system 22 further comprises a combination of conduits, couplings, conduit fittings and junction boxes interconnected together and will be of predetermined size to receive the heater power cables 21 within the conduit system 22 to provide protection for the heater power cables 21. The external gas source 141 will be of predetermined quantity and pressure of any of the well known combustible gases; and the gas piping system 219 will be of predetermined size of any of the well known gas piping systems to allow combustible gas to flow through the gas piping system 210 to provide gas energy used by the gas heating system 211 to produce the heat that protects the facilities or equipment. In the preferred embodiment of the gas heating system 211, the external gas source 141 comprises either natural gas or propane gas and the gas piping system 219 comprises a combination of piping, couplings, fittings and valves suitable for combustible gas service that are interconnected together.

Figure 6:
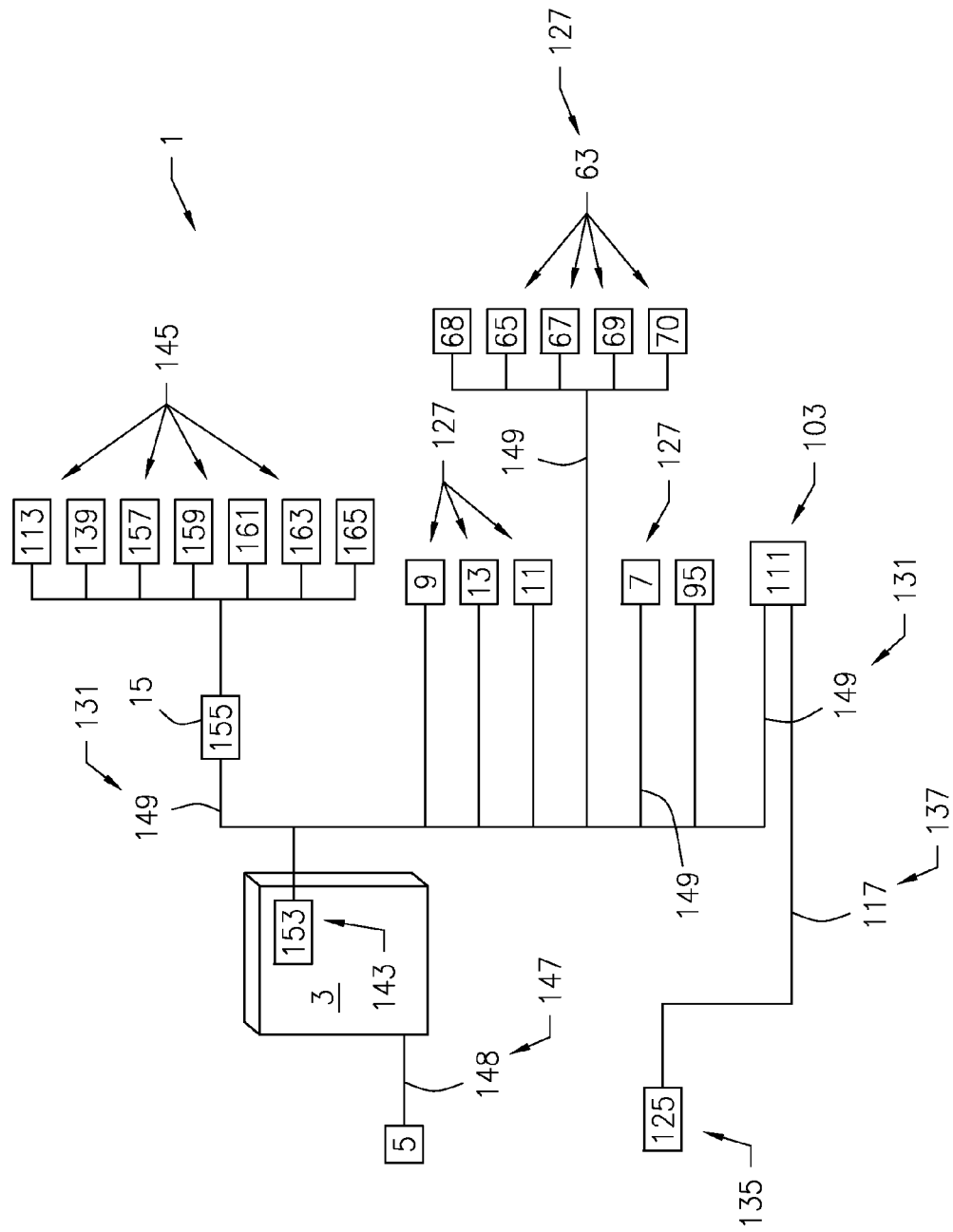
FIG. 6 is a partial schematic illustration of another embodiment of the overall adaptive freeze, snow or ice protection system of the present invention that shows remote sites, a sensing means and a hydronic heating system.
Figure 7:
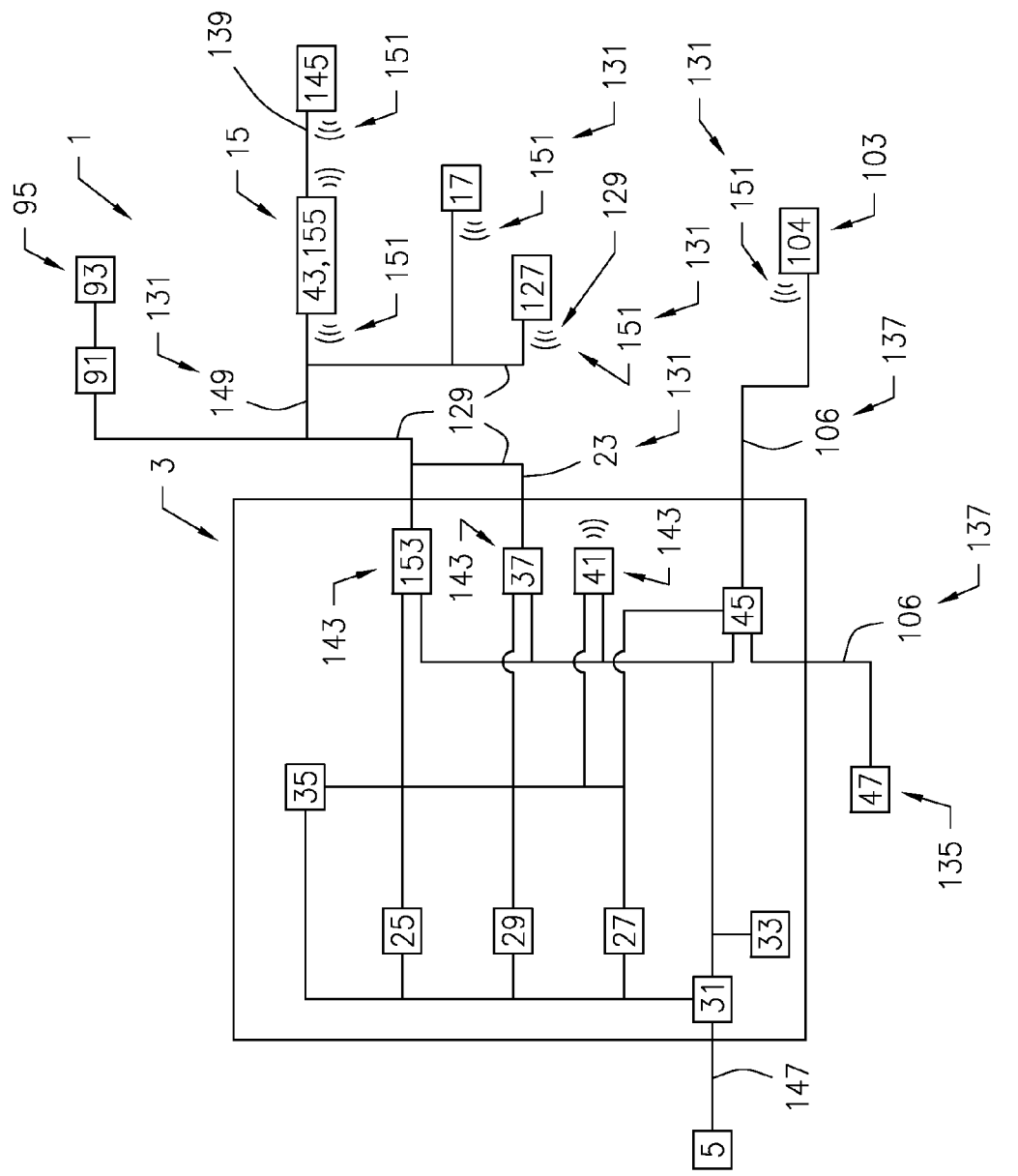
FIG. 7 is a more detailed schematic illustration of the system module with an electric heating cable system, wire cable system and wireless system showing another embodiment of the present invention.

As can be seen from FIG. 6 and FIG. 7, the protection system 1 has a control system means 95. The control system means 95 is connected to an external electrical control power source 5 by a control energy supply system 147. The external electrical control power source 5 provides the energy used by the control system means 95 to control the heating means 103 to produce the heat used by the protection system 1 to protect facilities and equipment. The external electrical control power source 5 can be either an AC or a DC power source. The AC power source would operate at 110 volts single phase. The DC power source would operate between a range of 5 volts to 150 volts. The control energy supply system 147 can be any of the well known control power distribution systems where the preferred embodiment of the control energy supply system 147 further comprises a plurality of control power cables 148 received inside a conduit system 22. The control power cables 148 will be of predetermined size and quantity to provide the electrical energy used to power the control system means 95 of the protection system 1. The conduit system 22 further comprises a combination of conduits, couplings, conduit fittings and junction boxes interconnected together and will be of predetermined size to receive the control power cables 148 within the conduit system 22 to provide protection for the control power cables 148.

The embodiment of the protection system 1 shown in FIG. 1 and FIG. 10 comprises an integrated expert system control module 3 (referred to as "system module 3" or "module 3" hereinafter), a sensing means 127, a control system means 95, an interconnection means 131, an energy supply system 137, a control energy supply system 147, roof components 119, pavement components 121, building components 123, and an external interface means 15 where roof components 119, pavement components 121 and building components 123 include a heating means 103. The external interface means 15 is interconnected to the internet 17 or other communication network by the interconnection means 131 to provide connection to remote sites 145. The protection system 1 is connected to an external energy source 135 by the energy supply system 137 to provide energy for the heating means 103 to produce the heat used by the protection system 1 to protect facilities or equipment. The protection system 1 is also connected to an external electrical control power source 5 by the control energy supply system 147 to provide energy to the protection system 1 in order to control how and when the heat is produced by the heating means 103.

The sensing means 127, the control system means 95, the heating means 103 and an external interface means 15 are connected to the system module 3 by the interconnection means 131. The sensing means 127, having a predetermined arrangement and being received in predetermined locations such that the sensing means 127 monitors for predetermined environmental conditions, converts the detected predetermined environmental conditions into a plurality of predetermined sensing means data signals 129 and transmits these sensing means data signals 129 to the system module 3. The system module 3 has a learning algorithm to perform a predetermined adaptive analysis using predetermined data and using predetermined inputs so that said processor 25 develops a plurality of system module control commands 133. The system module control commands 133 are sent to the control system means 95 and the heating means 103 by the system module 3. In response to the system module control commands 133, the control system means 95 manages the control systems of the protection system 1 in order to control how and when heat is produced by the heating means 103, and the heater control panel 91 manage the heat produced by the heating means 103 with the energy from the external energy source 135 in order to provide desired protection in response to predetermined environmental conditions to manage the possible effects of predetermined environmental conditions on facilities or equipment. The system module 3 would be programmed to maximize the efficiency of the systems by turning power on at the best time and proportioning the amount of energy used to be sufficient for the task at hand to provide major reductions in energy usage over other approaches.

Figure 9:
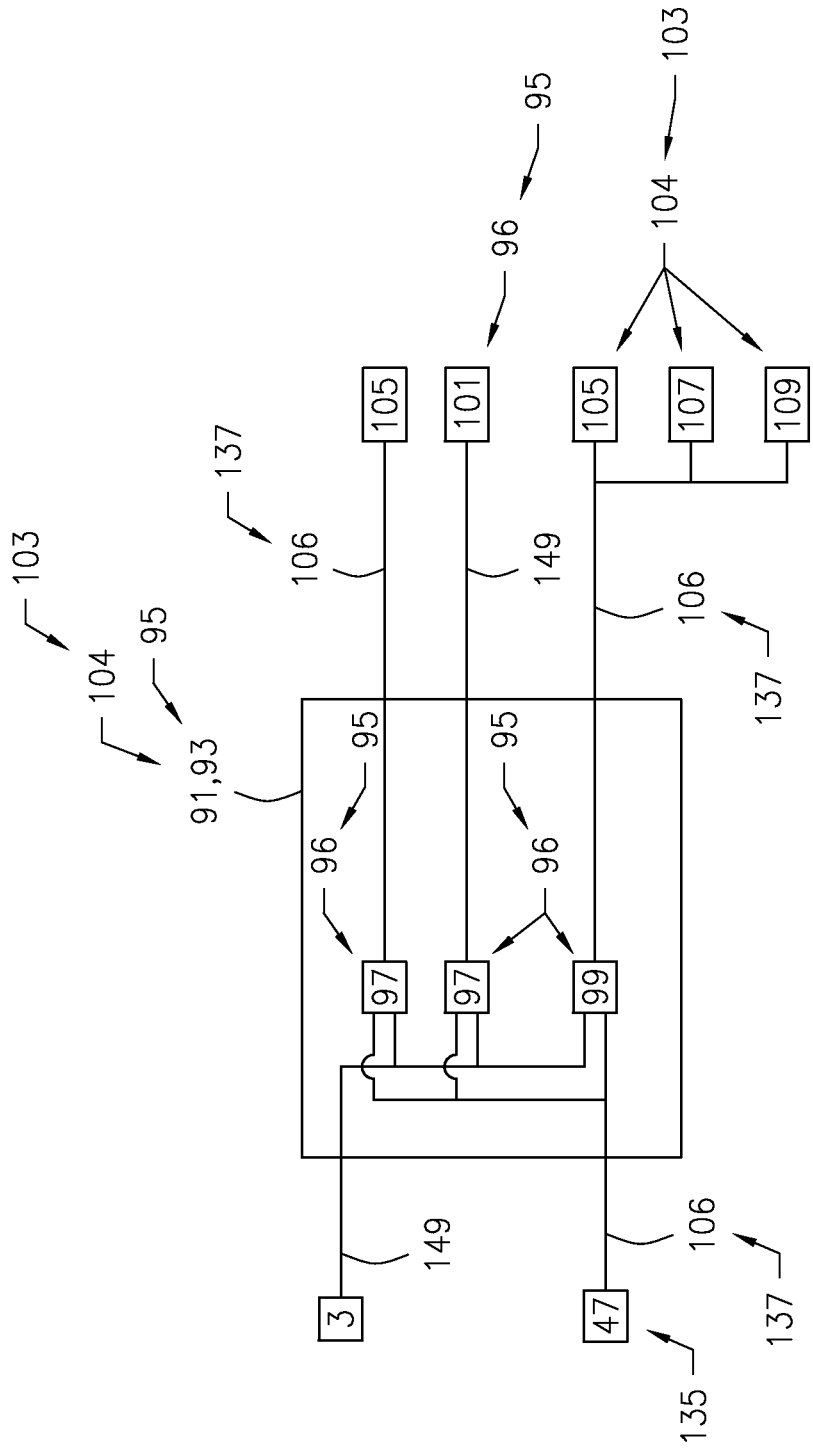
FIG. 9 is a more detailed schematic illustration of the heater control panel shown in FIG. 1, FIG. 2 and FIG. 3.
Figure 10:
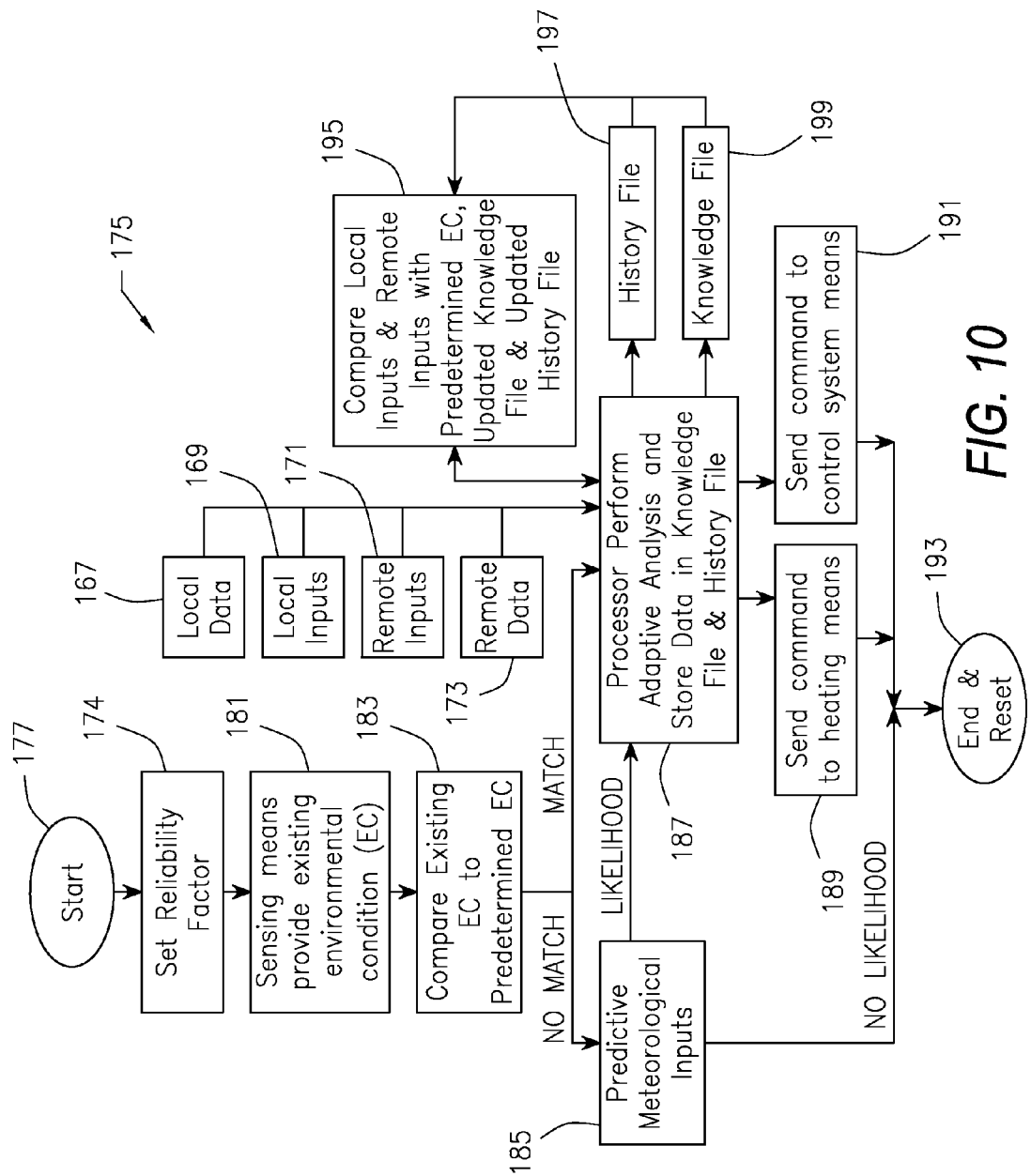
FIG. 10 is a block diagram of a method of operation of the adaptive freeze, snow or ice protection system of FIGS. 1 through 9.

As seen in FIG. 9 and FIG. 10, at times the control system means 95 and the heating means 103 are combined into one device such as a heater control panel 91. For example, the heater control panel 91 may contain a relay unit 95 that is actuated by the control system means 95. When the relay unit 95 is actuated, the relay unit 95 allows electrical energy to flow from the external energy source 135 to the heating means 103 through the energy supply system 137.

Also as shown in FIG. 1, FIG. 7 and FIG. 10, the protection system 1 uses local inputs 169, local data 167, remote inputs 173 and remote data 171. The local inputs 169 are inputs provided locally by various devices like a dedicated building management system 113 or a local interactive display 35 or generated internally by the system module 3. The remote inputs 173 are inputs provided from remote sites 145 to the system module 3 through the external interface means 15 via the internet 17 or other communication network. An example of a remote input 173 is an input from a remote control means 19 such as a remote monitoring station 163. The local data 167 are predetermined outputs obtained from monitoring all of the systems of the protection system 1 and other local devices. An example of local data 167 is the on/off status indication from one of the components of the control system means 95. The remote data 171 are predetermined outputs obtained from remote sites 145 over the external interface means 15 via the internet 17 or other communication network. An example of remote data 171 is the setting of the reliability factor from the remote microprocessor based device 165.

Figure 2:
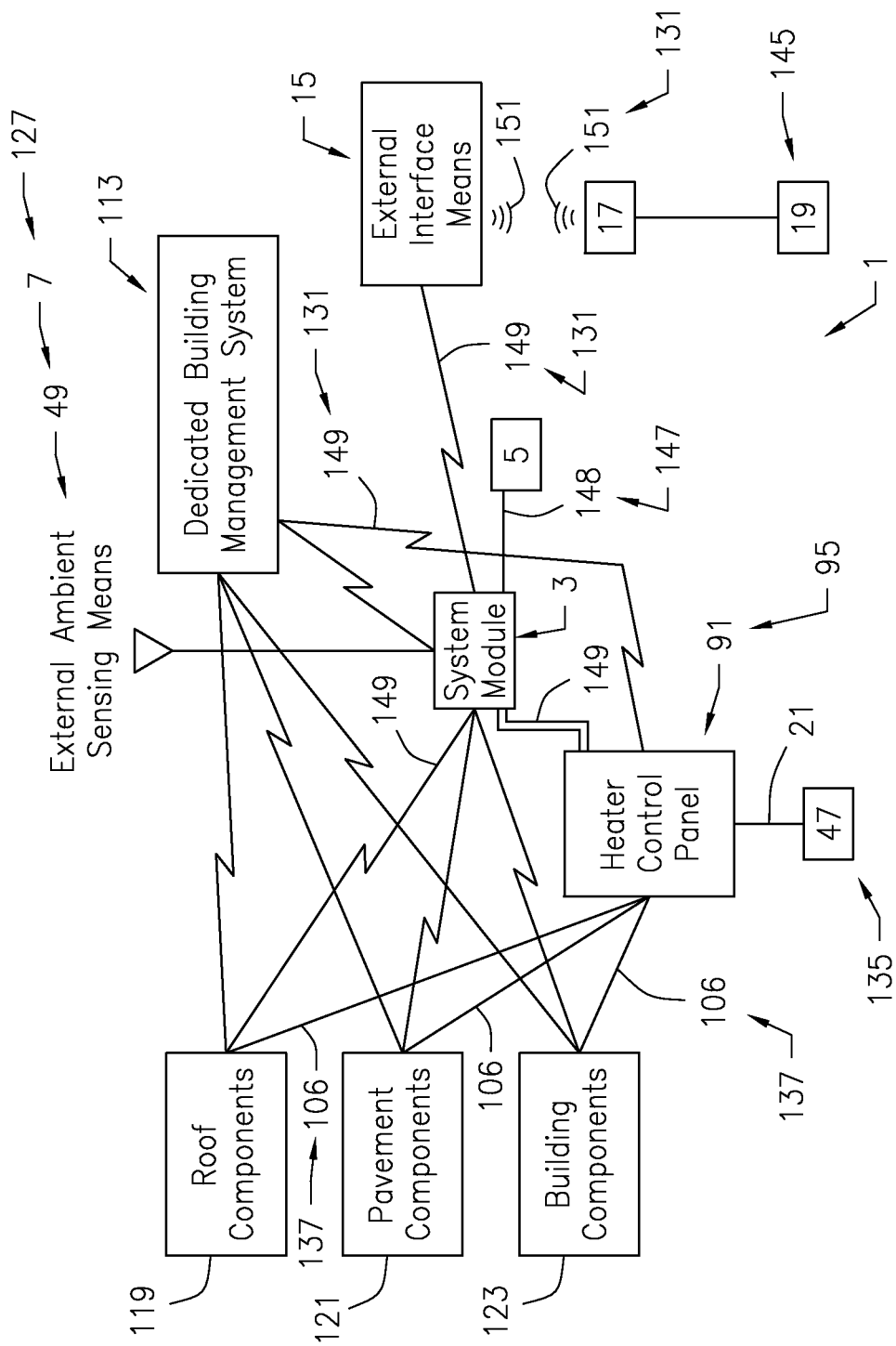
FIG. 2 is a schematic illustration of another embodiment of the overall adaptive freeze, snow or ice protection system of the present invention that includes an interface with a dedicated building management system.

Also as seen in FIG. 1, the sensing means 127 further comprises a freeze sensing means 7 where the freeze sensing means 7 further comprises an external ambient temperature sensing means 49. The control system means 95 further comprises a heater control panel 91. The interconnection means 131 further comprises a wired cable system 149. The energy supply system 137 further comprises a heater electric supply system 106. Another embodiment of the present invention is shown in FIG. 2 where the protection system 1 is connected to a dedicated building management system 113. The dedicated building management system 113 is connected to the protection system 1 by the interconnection means 131 to provide communication between the protection system 1 and the dedicated building management system 113 to allow a plurality of predetermined building inputs and to allow a plurality of predetermined building outputs to pass between the dedicated building management system 113 and the protection system 1. The dedicated building management system 113 uses the protection system inputs for protective system status information and the system module control commands 133 to control various functions within the dedicated building management system 113 so that the building and surrounding grounds are protected when predetermined environmental conditions occur or are predicted to occur. For example, when freezing, snowing or icing conditions are expected or detected, the protective system 1 and the dedicated building management system 113 would cooperate to initiate and/or shut off irrigation systems or turn off and/or on decorative lighting or to turn off and/or on building heating systems.

Figure 3:
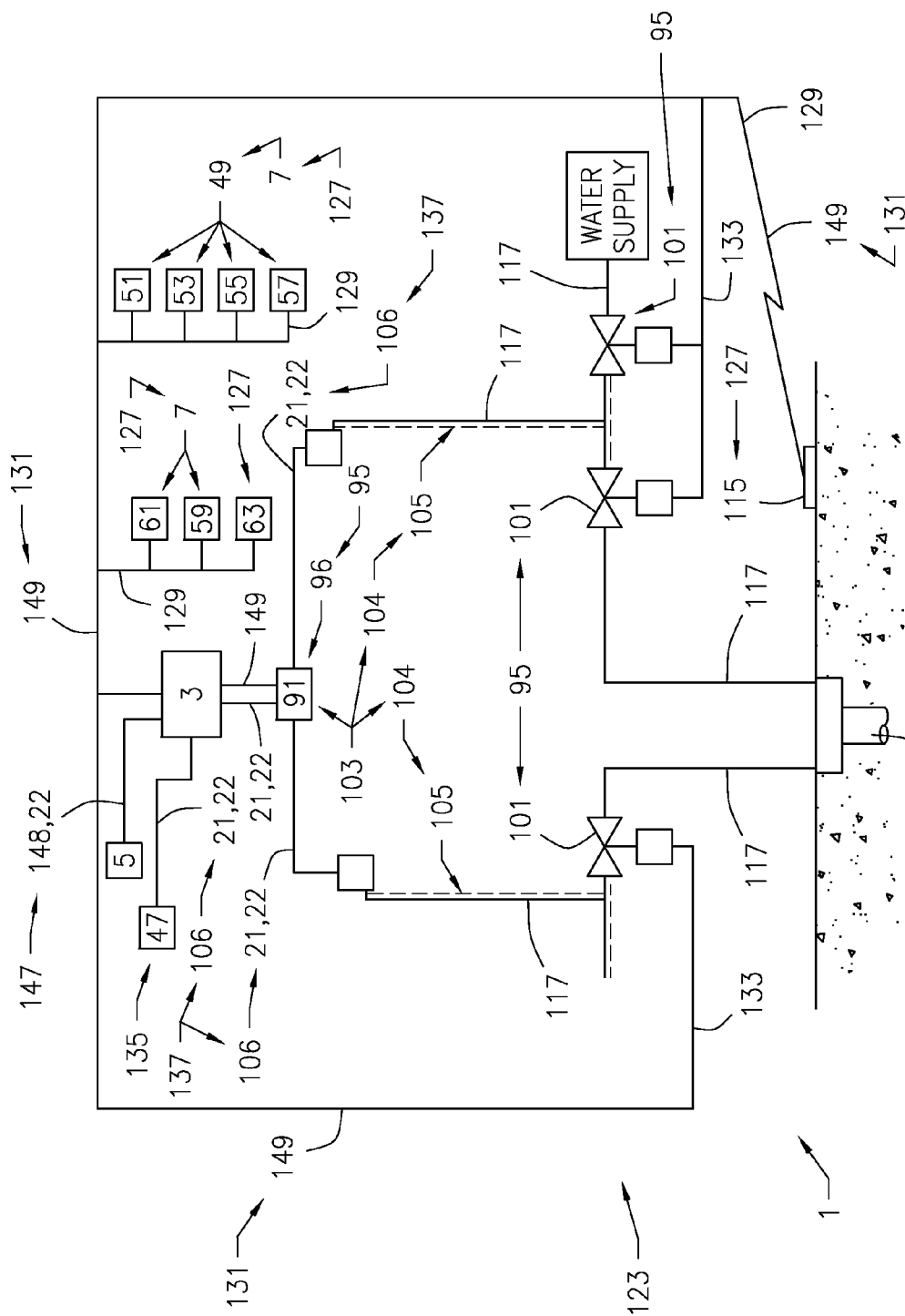
FIG. 3 is a schematic illustration of another embodiment of the overall adaptive freeze, snow or ice protection system of the present invention showing just the building components referenced on FIG. 1 and FIG. 2 that show freeze sensors.

FIG. 3 shows an example of the building components 123 of FIG. 1 and FIG. 2. In this embodiment of the invention, the building components 123 of the protection system 1 provide details of the sensing means 127, the heating means 103 and the control system means 95. The sensing means 127, the heating means 103 and the control system means 95 are connected to the system module 3 by the interconnection means 131. The sensing means 127 monitors for predetermined environmental conditions, converts the detected predetermined environmental conditions into a plurality of predetermined sensing means data signals 129 and transmits these sensing means data signals 129 to the system module 3. The sensing means 127 shown in FIG. 3 further comprises a freezing sensing means 7 and an optical detection means 63 to detect freezing conditions. The freezing sensing means 7 and the optical detection means 63 monitor the environment for freezing conditions and convert detected freezing environmental conditions into a plurality of predetermined sensing means data signals 129 which are sent to the system module 3. The freezing sensing means 7 further comprises an external ambient temperature sensing means 49, a freeze sensor 59 or a crystal freeze sensor 61. An example of a crystal freeze sensor 61 is the GE Security model number NX-685. The external ambient temperature sensing means 49 further comprises a sun-shielded ambient temperature sensor 51, a sun-shielded ambient temperature transmitter 53, a sun-shielded ambient temperature switch 55 or an infrared temperature sensor 57. Thermostats now are available as an ambient temperature sensor 51, as an ambient temperature transmitter 53 or as an ambient temperature switch 55. Examples of infrared temperature sensors 57 are the Raytek model XR, the Raytek model MI and the Micro-Epsilon model CTM3. As shown in FIG. 6, the optical detection means 63 further comprises a camera system 65, a video camera system 67, a night vision camera 68, an infrared camera system 69 or an infrared video camera system 70. Examples of video camera systems 67 are the Q-See model QSDS3612D, the Q-See model QSM5265C, the VideoSecu model 700TVL and the Swann model PRO-580. Examples of infrared video camera systems 70 are the FLIR Systems, Inc. model A310pt, the Infrared Camera Inc. X32 Pan and Tilt and the Lorex LBC6040. As shown in FIG. 3, the sensing means 127 farther comprises a water monitor 115 to detect the presence of water and to convert the detection of water into a plurality of predetermined sensing means data signals 129 which are sent to the system module 3.

The heating means 103 having a predetermined arrangement and being received in predetermined locations such that the heating means 103 provides desired protection in response to predetermined environmental conditions where the desired protection response to predetermined environmental conditions is to provide heat to keep the facility warm. As shown in FIG. 3, the external energy source 135 used to provide energy for the heating means 103 is an external electrical heater power source 47. The heating means 103 shown in FIG. 3 further comprises an electric heating system 104 where the electric heating system 104 provides the heat for the desired protection in response to the predetermined environmental condition of freezing. The external electrical heater power source 47 is connected to the system module 3 and is connected between the system module 3 and the electric heating system 104 by the energy supply system 137. The electric heating system 104 further comprises a heater control panel 91 and electric heating cables 105 where the energy supply system 137 connects the heater control panel 91 to the electric heating cables 105. The electric heating cables 105 are secured to a liquid piping system 117 to provide heat in response to the detection of freezing conditions by the sensing means 127 to keep the liquid piping system 117 protected. The energy supply system 137 further comprises a heater electric supply system 106 where the heater electric supply system 106 further comprises a plurality of heater power cables 21 received inside a conduit system 22. The heater power cables 21 allow electrical energy to flow from the external electrical heater power source 47 to the system module 3, from the system module 3 to the heater control panel 91 and from the heater control panel 91 to the electric heating cables 105. The electrical energy causes the electric heating cables 105 to heat up and keep the liquid piping system 117 from freezing in response to a detected predetermined environmental condition of freezing.

As shown in FIG. 3, the control system means 95 having a predetermined arrangement and being received in predetermined locations such that the control system means 95 provides desired protection in response to predetermined environmental conditions. The control system means 95 is connected to an external electrical control power source 5 by a control energy supply system 147. The control energy supply system 147 further comprises a plurality of control power cables 148 received inside a conduit system 22. The control system means 95 further comprise a heater control panel 91 and solenoid valves 101. As shown in FIG. 3, the interconnection means 131 further comprises a wired cable system 149. The system module 3 is connected to the heater control panel 91, and the heater control panel 91 is connected to the solenoid valves 101 by the wired cable system 149 to allow system module control commands 133 from the system module 3 to be sent to the heater control panel 91 and the solenoid valve 101. When the heater control panel 91 receives the system module control commands 133, it allows electrical energy to flow to the electric heating cables 105 which heats up the electric heating cables 105 to keep the liquid piping system 117 warm in response to the predetermined environmental condition of freezing. When the solenoid valve 101 receives the system module control commands 133 due to the freeze sensing means 7 detecting the predetermined condition of freezing, due to the water monitor 115 detecting a predetermined condition of water or due to the loss of power, where at least one solenoid valve 101 opens to drain the water piping into the sewer drain 209 and where at least one solenoid valve 101 closes to block the water supply into the facility. During the loss of power, the system module 3 and the solenoid valves 101 are provided power from a back-up battery 33 to allow the system module 3 to send system module control commands 133 to activate the solenoid valves 101.

Figure 4:
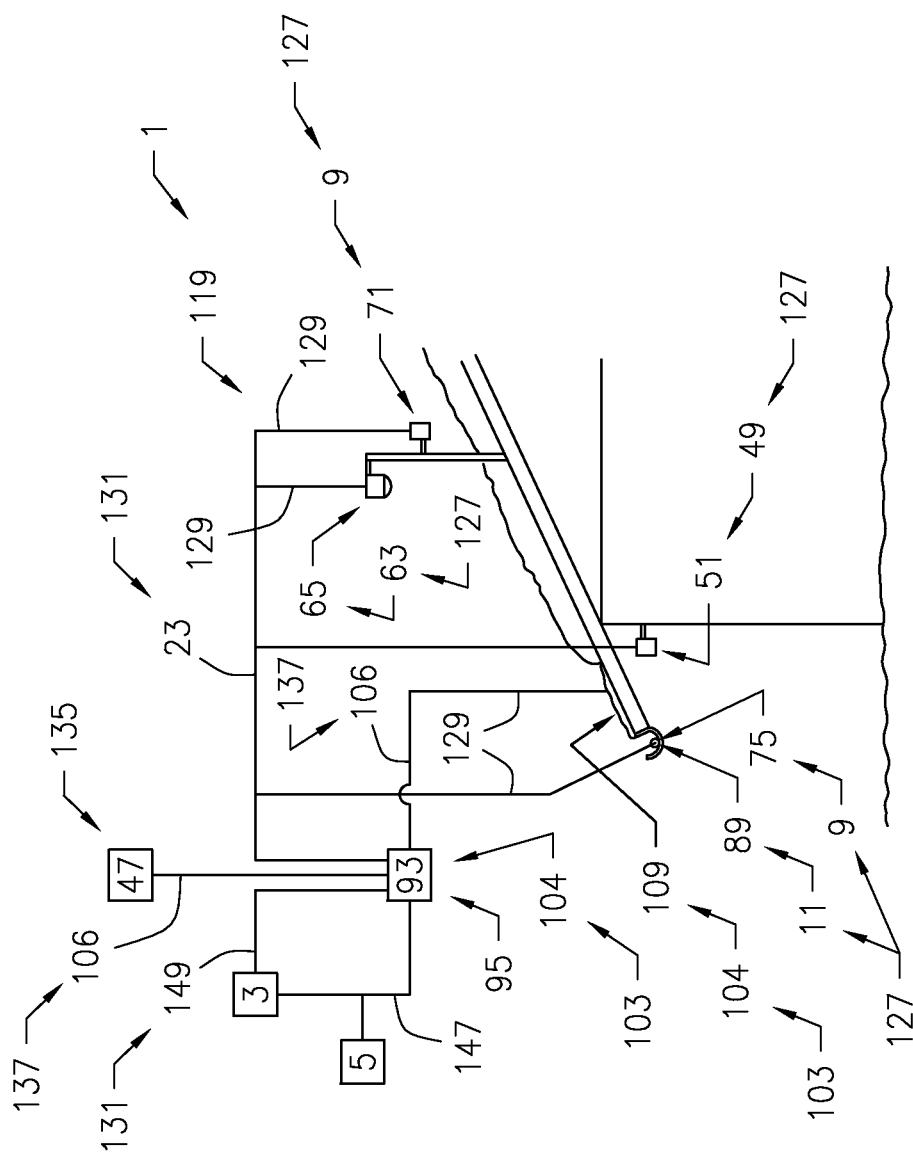
FIG. 4 is a schematic illustration of another embodiment of the overall adaptive freeze, snow or ice protection system of the present invention showing just the roof components referenced on FIG. 1 and FIG. 2 using an electric healing system.

FIG. 4 shows an example of the roof components 119 of FIG. 1 and FIG. 2. In this embodiment of the invention, the roof components 119 of the protection system 1 show additional details of the sensing means 127, the heating means 103 and the control system means 95. The sensing means 127, the heating means 103 and the control system means 95 are connected to the system module 3 by the interconnection means 131 where the interconnection means 131 further comprises a wired cable system 149 and a wired phone line 23. The control system means 95 further comprises a satellite controller 93. The satellite controller 93 interfaces with the system module 3 where the satellite controller 93 communicates with the sensing means 103 to transfer the sensing means data signals 129 back to the system module 3, to relay the system module control commands 133 from the system module 3 to the control system means 95 and to provide energy to the heating means 103 from the external energy source 135. Examples of a satellite controller 93 are snow controllers by Environmental Technology Inc., model GIT-4, model APS-3C and model SC-40C and by Automated Systems Engineering, model DS-2B and model DS-8. The functionality of the satellite controller may also be incorporated in the system module 3.

The sensing means 127 shown in FIG. 4 further comprises a snow sensing means 9, an ice sensing means 11, an optical detection means 63 and an external ambient temperature sensing means 49 to detect snowing and icing conditions. The snowing sensing means 9, the ice sensing means 11, the optical detection means 63 and the external ambient temperature sensing means 49 monitor for the predetermined environmental conditions of snowing and icing conditions and convert the detected environmental conditions into a plurality of predetermined sensing means data signals 129. The snowing sensing means 9 further comprises a snow sensor 71 and a gutter snow sensor 75. The ice sensing means 11 further comprises a gutter drip edge sensor 89. The optical detection means 63 further comprises a camera system 65 used to monitor for both snowing and icing conditions. The external ambient temperature sensing means 49 further comprises an ambient temperature sensor 51 used to detect temperatures that would allow icing conditions. The sensing means 127 is connected to a satellite controller 93, and the satellite controller 93 is connected to the system module 3 by the interconnecting means 131. Therefore, the sensing means data signals 129 are allowed to pass from the sensing means 127 though the satellite controller 93 to the system module 3. The interconnecting means 131 further comprises a wired cable system 149 and a wired phone line 23 where the wired cable system 149 connects the system module 3 to the satellite controller 93 and where the wired phone lines 23 connect the satellite controller 93 to the sensing means 127.

The heating means 103 shown in FIG. 4 further comprises an electric heating system 104 where the electric heating system 104 provides desired protection in response to the predetermined environmental condition of freezing. The electric heating system 104 further comprises a satellite controller 93 and an electric heating fixture 109. The energy supply system 137 connects the external energy source 135 to the satellite controller 93 and the satellite controller 93 to the electric heating fixture 109. A plurality of electric heating fixtures 109 are attached to the edge of the roof to provide heat in response to the detection of snowing and icing conditions by the sensing means 127 to keep the roof protected.

As shown in FIG. 4, the external energy source 135 used to provide energy for the heating means 103 is an electric heating system 104. The electric heating system 104 further comprises an external electrical heater power source 47. The energy supply system 137 further comprises a heater electric supply system 106. The external electrical heater power source 47 is connected to the satellite controller 93 and is connected between the satellite controller 93 and the electric heating fixture 109 by the heater electric supply system 106. The heater electric supply system 106 allows electrical energy to flow from the external electrical heater power source 47 to the satellite controller 93 and from the satellite controller 93 to the electric heating fixtures 109. The electrical energy causes the electric heating fixtures 109 to heat up and keep the facility warm in response to a detected predetermined environmental condition. Both the system module 3 and the satellite controller 93 are connected to an external electrical control power source 5 by a control energy supply system 147 to provide electrical control energy to power the system module 3, the satellite controller 93, the sensing means 127, the heating means and the control system means 95.

The control system means 95 shown in FIG. 4 having a predetermined arrangement and being received in predetermined locations such that control system means 95 provide desired protection in response to the predetermined environmental condition of snowing and icing. In this embodiment, the control system means 95 further comprises a satellite controller 93. The system module 3 is connected to the satellite controller 93 by the wired cable system 149 to allow system module control commands 133 from the system module 3 to be sent to the satellite controller 93. When the satellite controller 93 receives the system module control commands 133, the satellite controller 93 allows electrical energy to flow from the external electrical heater power source 47 to the electric heating fixtures 109 through the heater electric supply system 106, which heats up the electric heating fixtures 109 to keep the roof warm in response to predetermined environmental conditions or the prediction of a predetermined environmental condition occurring within a predetermined time.

Figure 5A:
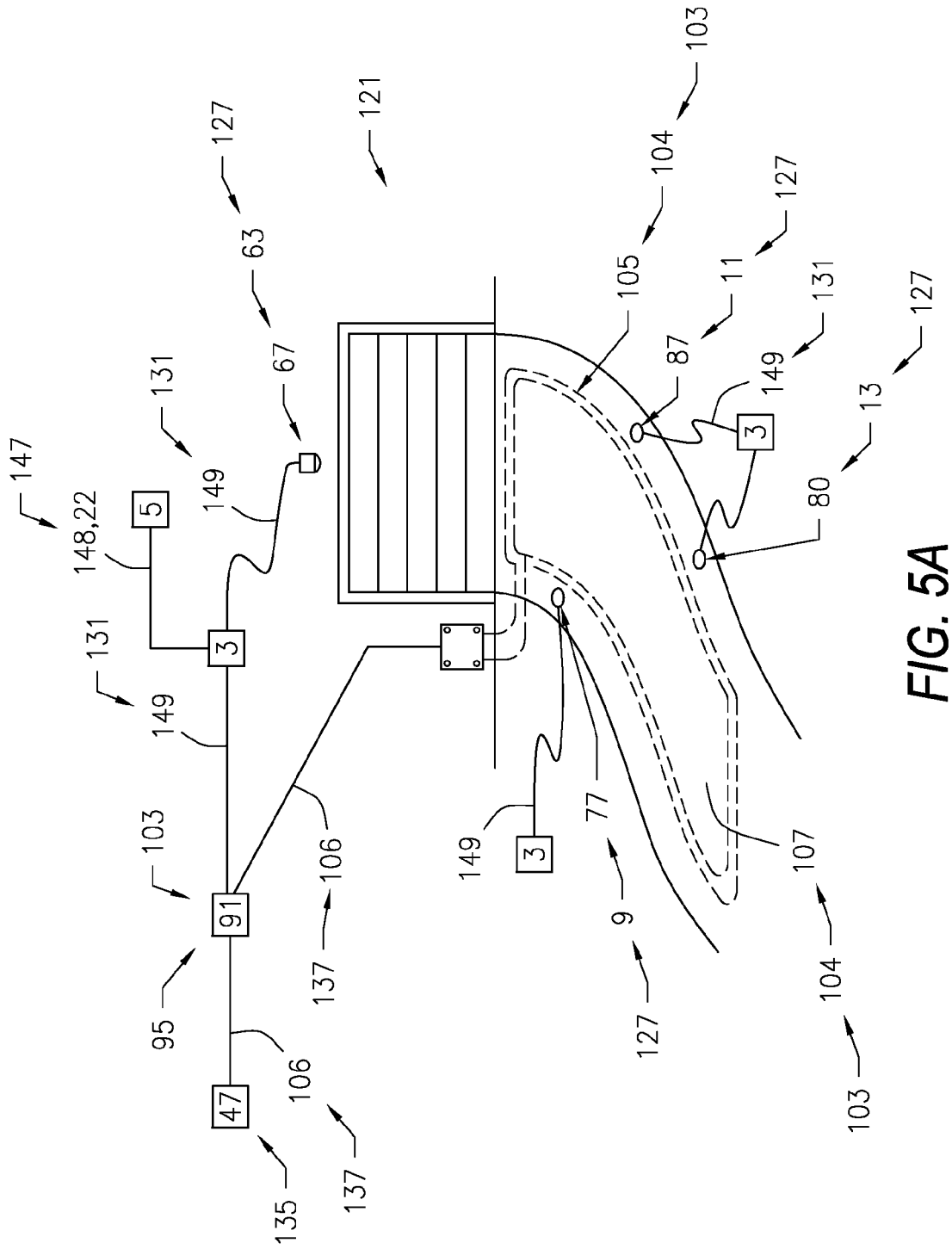
FIG. 5A is a schematic illustration of another embodiment of the overall adaptive freeze, snow or ice protection system of the present invention showing just the pavement components referenced on FIG. 1 and FIG. 2 using an electric heating system where the heat used to protect the pavement is produced by the combination of electric heating cables and electric heat mats.

FIG. 5A shows an example of the pavement components 121 of FIG. 1 and FIG. 2. In this embodiment at the invention, the pavement components 121 of the protection system 1 show additional details of the sensing means 127, the heating means 103 and the control system means 95. The sensing means 127, the heating means 103 and the control system means 95 are connected to the system module 3 by the interconnection means 131 where the interconnection means 131 further comprises a wired cable system 149. The system module 3 is connected to an external electrical control power source 5 by a control energy supply system 147 to provide 10 electrical control energy to the system module 3, the heater control panel 91, the sensing means 127 and the control system means 95.

The sensing means 127 shown in FIG. 5A further comprises a snow sensing means 9, an ice sensing means 11, a snow and ice sensing means 13 and an optical detection means 63 to detect snowing and icing conditions. The snowing sensing means 9, ice sensing means 11, the snow and ice sensing means 13 and the optical detection means 63 monitors for the predetermined environmental condition of snowing and icing and converts these predetermined environmental conditions into a plurality of predetermined sensing means data signals 129. The snowing sensing means 9 further comprises a pavement snow sensor 77. The ice sensing means 11 further comprises a pavement ice sensor 87. The snow and ice sensing means 13 further comprises a pavement snow and ice sensor 80. The optical detection means 63 further comprises a video camera system 67. These snow sensors, ice sensors and combined snow and ice sensors detect snowing and icing conditions and convert these predetermined environmental conditions into a plurality of predetermined sensing means data signals 129 that are sent back to the system module 3 by the wired cable system 149.

FIG. 5A shows a heating means 103 having a predetermined arrangement and being received in predetermined locations such that heating means 103 provides desired protection in response to predetermined environmental condition of snowing and icing. The heating means 103 is connected to an external energy source 135 which in this embodiment is an external electrical heater power source 47. The heating means 103 shown in FIG. 5A further comprises an electric heating system 104 where the electric heating system 104 provides desired protection in response to the predetermined environmental condition of snowing and icing, the electric heating system 104 further comprises electric heating cables 105, electric heat mats 107 or a combination of electric heating cables 105 and electric heat mats 107 and a heater control panel 91. The energy supply system 137 further comprises a heater electric supply system 106. The heater electric supply system 106 connects the external electrical heater power source 47 to the heater control panel 91 and connects the heater control panel 31 to the electric heating cables 105, electric heat mats 107 or a combination of electric heating cables 105 and electric heat mats 107. The electric heating cables 105 and electric heat mats 107 are placed beneath the surface of the pavement to provide heat in response to the detection of snowing or icing conditions by the sensing means 127 to keep the pavement components 121 protected.

The control system means 95 shown in FIG. 5A having a predetermined arrangement and being received in predetermined locations such that control system means 95 provide desired protection in response to predetermined environmental condition of snowing and icing. The control system means 95 further comprise a heater control panel 91. The system module 3 is connected to the heater control panel 91 by the wired cable system 149 to allow system module control commands 133 from the system module 3 to be sent to the heater control panel 91. When the heater control panel 91 receives the system module control commands 133, the heater control panel 91 allows electrical energy to flow from the external electrical heater power source 47 to the electric heating cables 105 and to the electric heat mats 107 through the heater electric supply system 106 which heats up the electric heating cables 105 and the electric heat mats 107 to keep the pavement warm in response to predetermined environmental conditions.

Figure 5B:
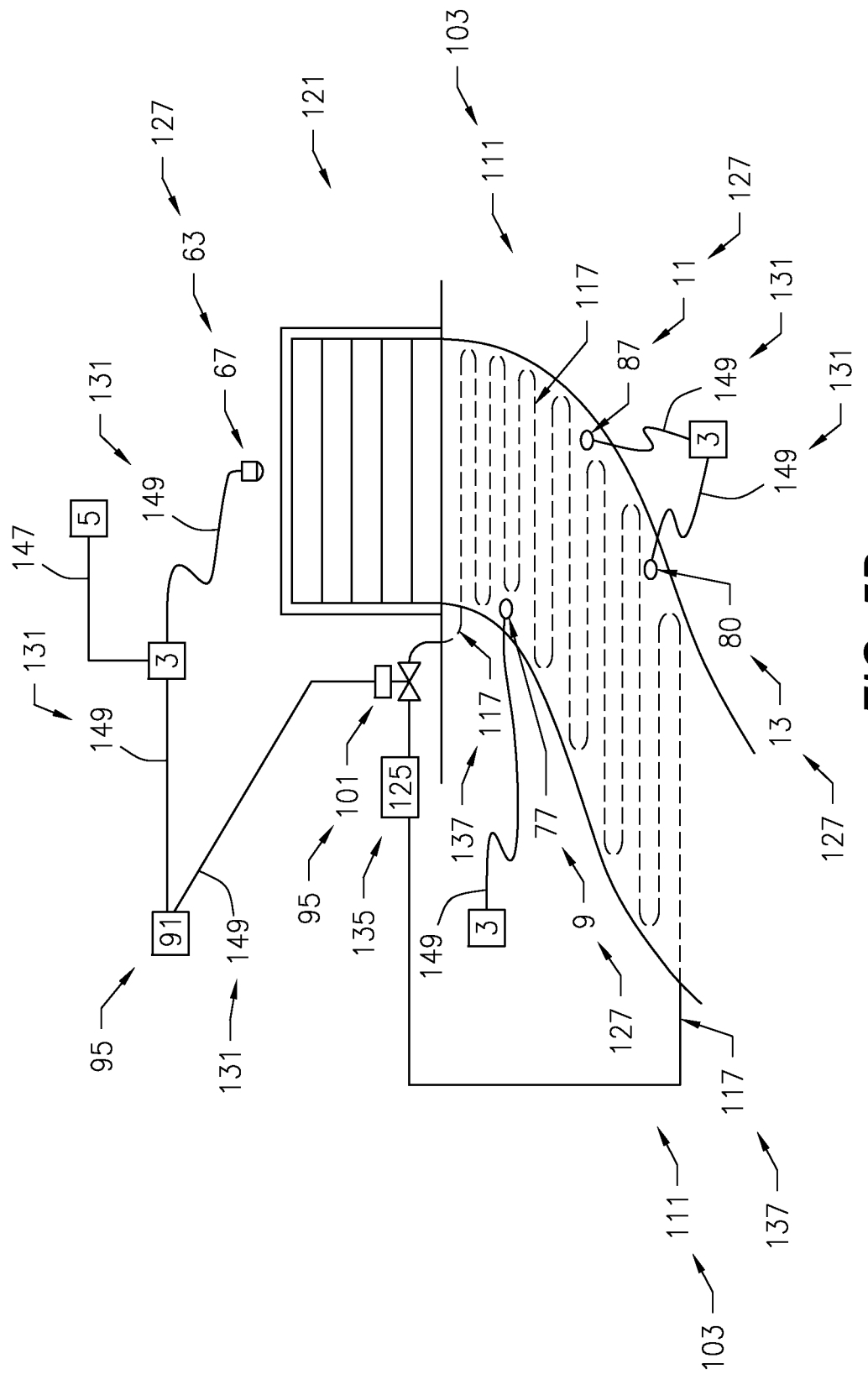
FIG. 5B is a schematic illustration of another embodiment of the overall adaptive freeze, snow or ice protection system of the present invention showing just the pavement components referenced on FIG. 1 and FIG. 2 using a hydronic heating system.

FIG. 5B shows an alternate embodiment of the pavement components 121 of FIG. 1 and FIG. 2. In this embodiment, the heating means 103 further comprises a hydronic heating system 111 where the external energy source 135 comprises a reservoir of heat transfer fluid 125 and where the energy supply system 137 further comprises a liquid piping system 117 such that the hydronic heating system 111 heats the heat transfer fluid 125 and circulates it through the liquid piping system 117 to provide heat in response to the system module control commands 133 from the system module 3 in order to provide desired protection in response to predetermined environmental conditions.

The control system means 95 shown in FIG. 5B further comprises a heater control panel 91 and at least one solenoid valve 101. The system module 3 is connected to the heater control panel 91 by the wired cable system 149 to allow system module control commands 133 from the system module 3 to be sent to the heater control panel 91. The heater control panel 91 is connected to at least one solenoid valve 101 by the wired cable system 149. When the heater control panel 91 receives the system module control commands 133, the heater control panel 91 sends a signal to at least one solenoid valve 101 to allow the heat transfer fluid 125 to circulate through the liquid piping system 117 to provide heat in response to the system module control commands 133 from the system module 3 to keep the pavement warm in response to predetermined environmental conditions or the prediction of a predetermined environmental conditions occurring within a predetermined time.

Figure 5C:
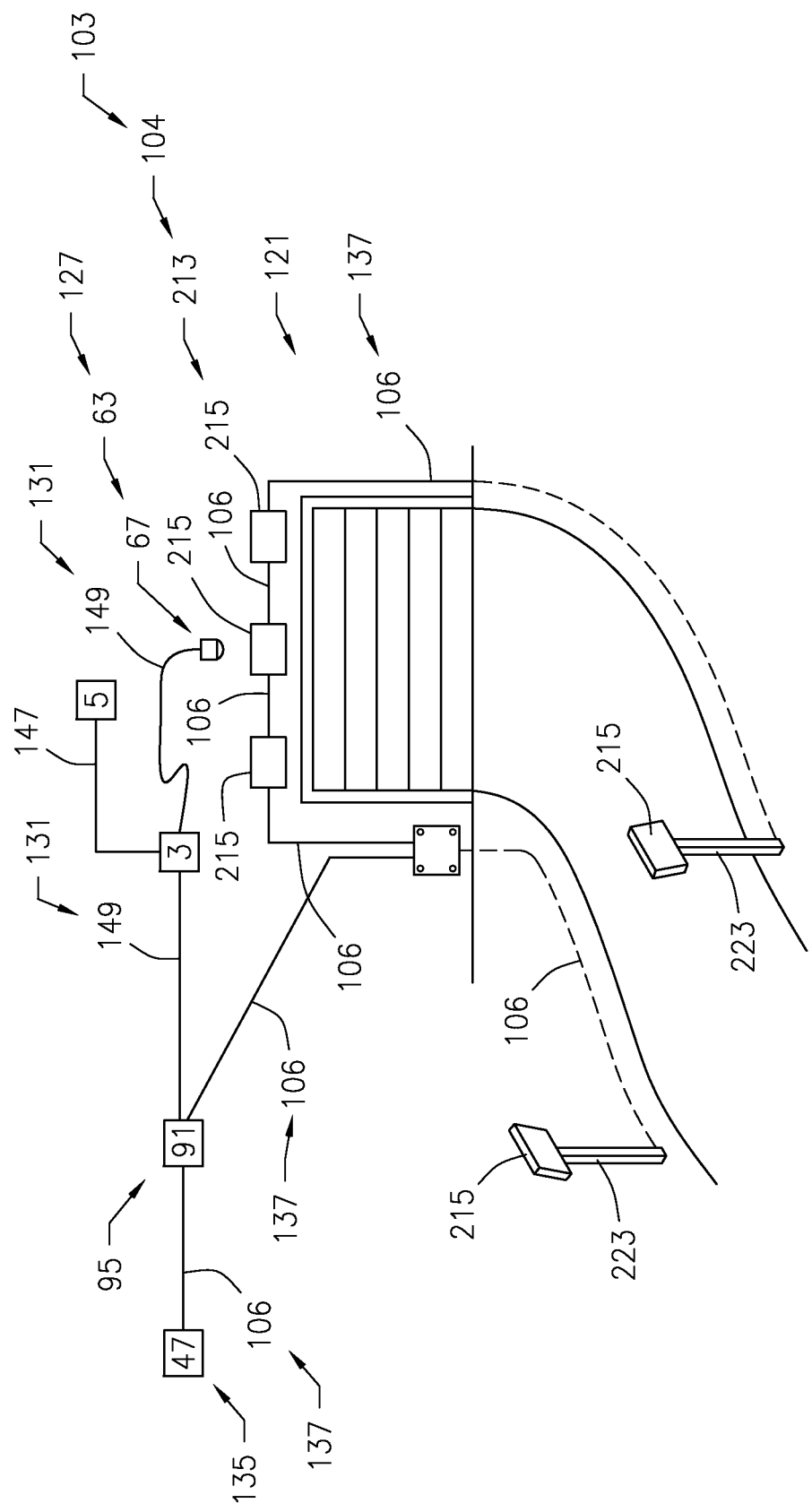
FIG. 5C is a schematic illustration of another embodiment of the overall adaptive freeze, snow or ice protection system of the present invention showing just the pavement components referenced on FIG. 1 and FIG. 2 using an electric heating system where the heat used to protect pavement is produced by electric infrared heaters.

FIG. 5C shows another alternate embodiment of the pavement components 121 of FIG. 1 and FIG. 2. In this embodiment, the heating means 103 further comprises an electrical heating system 104 and the electrical heating system 104 further comprises an electrical infrared heating system 213. The external energy source 135 comprises an external electrical heater power source 47. The energy supply system 137 further comprises a heater electric supply system 106. The electrical supply system 106 connects the external electrical heater power source 47 to the heater control panel 91 and connects the heater control panel 91 to the electrical infrared heating system 213 to provide heat in response to the system module control commands 133 from the system module 3 in order to provide desired protection in response to predetermined environmental conditions. The electrical infrared heating system 213 further comprises a plurality of electric infrared heaters 215 mounted overhead of the area of pavement to be protected and interconnected by the electrical supply system 106. Typical mounting of an electric infrared heater 215 includes surface mounting to an exterior wall; ceiling mounting to exterior structures like a car port or a porch; and mounting on top of a pole 223. An example of electric infrared heaters 215 are any one of a number of Fostoria outdoor rated electric infrared heaters.

Figure 5D:
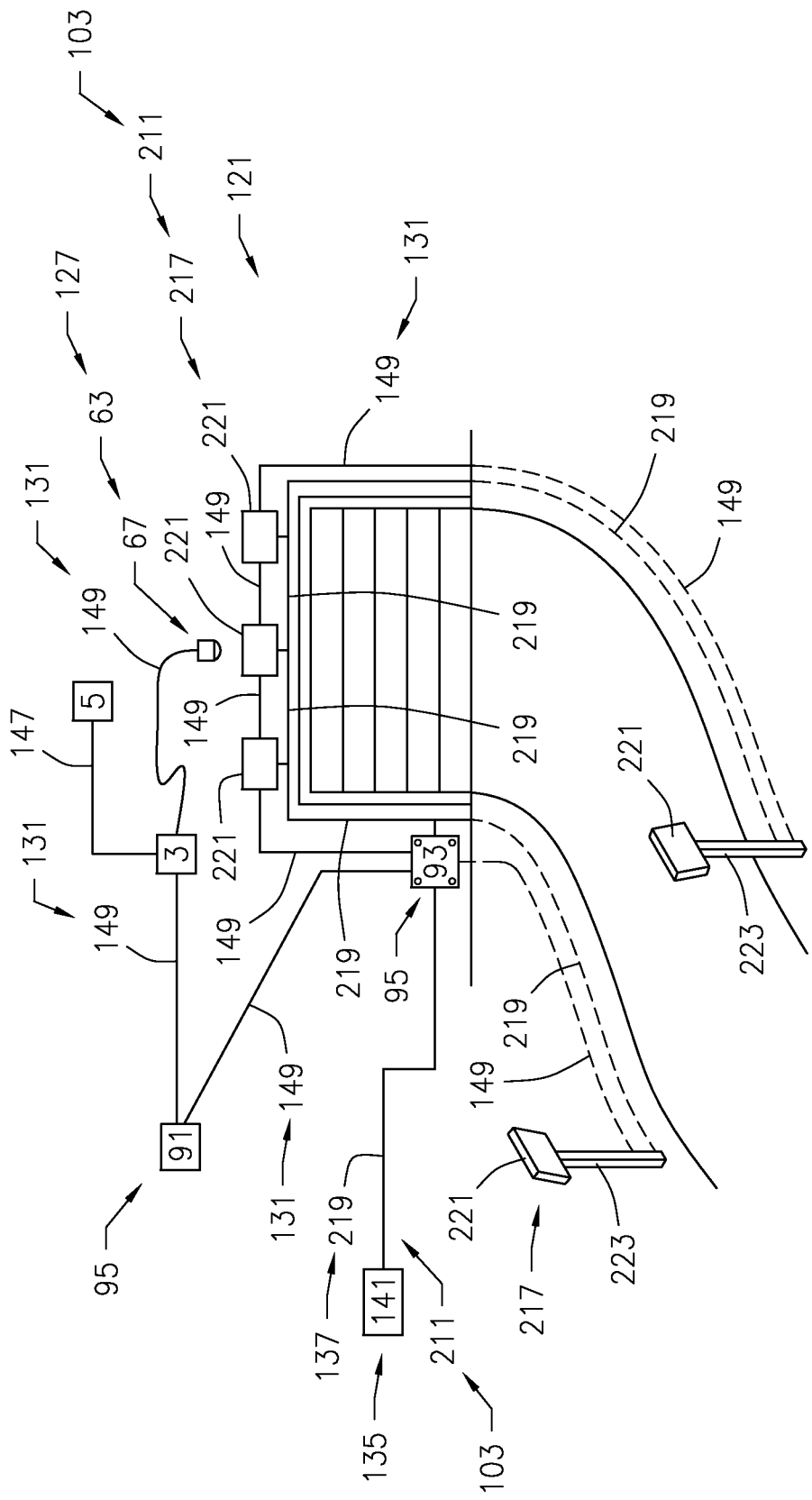
FIG. 5D is a schematic illustration of another embodiment of the overall adaptive freeze, snow or ice protection system of the present invention showing just the pavement components referenced on FIG. 1 and FIG. 2 using a gas infrared heating system.

FIG. 5D shows yet another alternate embodiment of the pavement components 121 of FIG. 1 and FIG. 2. In this embodiment, the heating means 103 further comprises a gas heating system 211 and the gas heating system 211 further comprises a gas infrared heating system 217. The external energy source 135 further comprises an external gas source 141. The energy supply system 137 further comprises a gas piping system 219. The gas piping system 219 connects the external gas source 141 to a satellite controller 93 and connects the satellite controller 93 to the gas infrared heating system 219 to provide heat in response to the system module control commands 133 from the system module 3 in order to provide desired protection in response to predetermined environmental conditions. The gas infrared heating system 217 further comprises a plurality of gas infrared heaters 221 mounted overhead of the area of pavement to be protected and interconnected by the gas piping system 219. Typical mounting of a gas infrared heater 221 includes surface mounting to an exterior wall; ceiling mounting to exterior structures like a car port or a porch; and mounting on top of a pole 223. An example of electric infrared heaters 215 are any one of a number of Superior Radiant Products outdoor rated gas infrared heaters.

As can be seen from FIG. 5D, the protection system 1 has a system module 3, a control system means 95 and a control energy supply system 147. The system module 3 is connected to an external electrical control power source 5 by the control energy supply system 147 to provide electrical energy to be used by the system module 3 and the control system means 95 to control the gas infrared heating system 217 to produce the heat used by the protection system 1 to protect the pavement. The system module 3 is connected to the control system means 95 by an interconnecting means 131. As shown in FIG. 5D, the control system means 95 further comprises a heater control panel 91 and a satellite controller 93. The interconnecting means 131 further comprises a wired cable system 149. The wired cable system 149 connects the system module 3 to the heater control panel 91 and connects the heater control panel 91 to the satellite controller 93. The wired cable system 149 allows system module control commands 133 from the system module 3 to be sent to the heater control panel 91 and to be sent from the heater control panel 91 to the satellite controller 93. The satellite controller 93 is connected to at least one gas infrared heater 221 by the wired cable system 149. When the satellite controller 93 receives the system module control commands 133 from the system module 3 via the heater control panel 91, the satellite controller 93 sends a signal to at least one gas infrared heater 221 to turn on and use the combustible gas from the gas piping system 219 to generate heat to keep the pavement warm in response to predetermined environmental conditions or the prediction of a predetermined environmental condition occurring within a predetermined time. FIG. 6 shows another embodiment of the protection system 1 with additional details on the system module 3, the sensing means 127, the heating means 103 and the external interface means 15 where the protection system 1 further comprises a plurality of remote sites 145. As seen in FIG. 6, the system module 3 further comprises an internal interface means 143 where the internal interface means 143 further comprises a local area network device 153. The sensing means 127, the heating means 103 and the control system means 95 are connected to the system module 3 by the interconnection means 131 where the interconnection means 131 further comprises a wired cable system 149. The system module 3 is connected to an external electrical control power source 5 by a control energy supply system 147 to provide electrical control energy used to power the system module 3, the heating means 103, the sensing means 127 and the control system means 95. The control energy supply system 147 further a plurality of control power cables 148 received inside a conduit system 22.

The sensing means 127 shown in FIG. 6 has a predetermined arrangement and being received in predetermined locations such that sensing means 127 monitors for the predetermined environmental condition of freezing, snowing, icing, and snowing and icing conditions and converts these predetermined environmental conditions into a plurality of predetermined sensing means data signals 129 that are sent back to the system module 3 by the wired cable system 149. The sensing means 127 further comprises a freeze sensing means 7, a snow sensing means 9, an ice sensing means 11, a snow and ice sensing means 13 and an optical detection means 63 to detect freezing, snowing, icing, and snowing and icing conditions. The freeze sensing means 7, the snow sensing means 9, the ice sensing means 11, the snow and ice sensing means 13 and the optical detection means 63 monitor for the predetermined environmental condition of freezing, snowing, icing, and snowing and icing conditions and convert these predetermined environmental conditions into a plurality of predetermined sensing means data signals 129 that are sent back to the system module 3 by the wired cable system 149. The optical detection means 63 further comprises a camera system 65, a video camera system 67, a night vision camera 68, an infrared camera 69 or an infrared video camera system 70. The optical detection means 63 would include a remotely controlled camera or video camera with night lighting or night vision capabilities. Additionally, the optical detection means 63 with a light for night use or night vision capabilities could be located so as to scan the specific area of a facility like the roof. This optical detection means 63 would be programmed to scan the roof needing protection at a predetermined interval and feed data into the learning algorithm to turn the system on when the color went to a predetermined brightness such as a whiter shade or the thermal image indicating predetermined temperatures. This alternate sensor using the optical detection means 63 could replace the gutter drip edge sensor 89 in some systems. The optical detection means 63 would shut off the protection system 1 when the camera indicates that the snow was melted. When the ambient temperature is above the high temperature set point or when the ambient temperature is below the minimum temperature set point where no liquid water is likely to exist, the heating means 103 is turned off. The optical detection means 63 would also play an important safety role by allowing remote monitoring of typically hidden areas on a roof or in a facility.

The heating means 103 in FIG. 6 having a predetermined arrangement and being received in predetermined locations such that the heating means 103 provides desired protection in response to the predetermined environmental condition of freezing, snowing, icing, and snowing and icing conditions. The heating means 103 shown in FIG. 6 further comprises a hydronic heating system 111 where the external energy source 135 comprises a reservoir of heat transfer fluid 125 and where the energy supply system 137 further comprises a liquid piping system 117 such that the hydronic heating system 111 heats the heat transfer fluid 125 and circulates it through the liquid piping system 117 to provide heat in response to the system module control commands 133 from the system module 3 in order to provide desired protection in response to predetermined environmental conditions or the prediction of a predetermined environmental condition occurring within a predetermined time.

FIG. 6 shows an external interface means 15 where the external interface means 15 is connected to a plurality of remote sites 145 to provide communication between the external interface means 15 and remote sites 145 to allow predetermined inputs and predetermined outputs to pass between the external interface means 15 and the remotes sites 145. The external interface means 15 further comprises a local area network server 155 or the equivalent. The interconnection means 131 connects the external internet means 15 to the internal interface means 143 in the system module 3 to provide communication between the internal interface means 143 and the external interface means 15 to allow predetermined inputs and predetermined outputs to pass between external interface means 15 and the internal interface means 143. The internal interface means 143 further comprises a local area network device 153. The interconnection means 131 further comprises a wired cable system 149. The local area network device 153 is connected to the local area network server 155 or the equivalent by the wired cable system 149, and the local area network server 155 or the equivalent is connected to a plurality of remote sites 145 by the wired cable system 149 to allow communication between the system module 3 and the plurality of remote sites 145.

FIG. 6 shows that the protection system 1 is connected to a plurality of remote sites 145. The remote sites 145 provide remote inputs 173 and remote data 171 to the protection system 1. The remote sites 145 further comprise a dedicated building management system 113 such that the external interface means 15 provides communication with the dedicated building management system 113 to allow a plurality of predetermined building inputs and to allow a plurality of predetermined outputs to pass between the dedicated building management system 113 and the system module 3 via the external interface means 15. The remote sites 145 further comprise weather data sites 157 such that the external interface means 15 provides communication with the weather data sites 157 to allow a plurality of predetermined inputs of which some are predetermined meteorological inputs 139 and to allow a plurality of predetermined outputs to pass between weather data sites 157 and the system module 3 via the external interface means 15. Examples of weather sites that the protection system 1 could access are: (1) local weather forecasts and warnings; (2) NOAA Aviation weather forecast; (3) National Weather Service's snow accumulation forecast; (4) analysis of satellite images of storm movement; and (5) analysis of rates of change of temperature profiles relevant to the physical location. The remote sites 145 further comprise remote camera sites 159 such as traffic cameras, security cameras, weather web cameras and ski area web cameras. The external interface means 15 provides communication with the remote camera sites 159 to allow a plurality of predetermined inputs as predetermined remote inputs 173 and to allow a plurality of predetermined outputs to pass between the remote camera sites 159 and the system module 3 via the external interface means 15. The remote sites 145 further comprise remote camera control sites 161 such as traffic camera control sites and security cameras control sites. The external interface means 15 provides communication with the remote camera control sites 161 to allow a plurality of predetermined inputs and to allow a plurality of predetermined outputs to pass between the remote camera control sites 161 and the system module 3 via the external interface means 15. The remote sites 145 further comprise a remote monitoring station 163 such that the external interface means 15 provides communication with the remote monitoring station 163 to allow a plurality of predetermined inputs and to allow a plurality of predetermined outputs to pass between the remote monitoring station 163 and the system module 3 via the external interface means 15. The remote sites 145 further comprise microprocessor based devices 165 such that the external interface means 15 provides communication with the microprocessor based devices 165 to allow a plurality of predetermined inputs and to allow a plurality of predetermined outputs to pass between the microprocessor based devices 165 and the system module 3 via the external interface means 15. The microprocessor based devices 165 further comprises a computer, a tablet or mobile devices such as a cell phone.

As shown in FIG. 7, the system module 3 comprises an interactive display 35, a processor 25, a local memory 29, an internal interface means 143, a signal convertor 27, a power unit 31, a back-up battery 33, and an output power unit 45 having a predetermined arrangement in an enclosure not shown. The interactive display 35, the processor 25, the internal interface means 143, the signal convertor 27 and the output power unit 45 are interconnected to provide communication between the interactive display 35, the processor 25, the internal interface means 143, the signal convertor 27 and the output power unit 45 to allow a plurality of predetermined inputs and a plurality of predetermined outputs to pass between the interactive display 35, the processor 25, the internal interface means 143, the signal converter 27 and the output power unit 45. The local memory 29 is interconnected to the interactive display 35, to the processor 25, to the internal interface means 143, to the signal convertor 27 and to the output power unit 45 to provide communication between the local memory 29 and the interactive display 35, the processor 25, the internal interface means 143, the signal convertor 27 and the output power unit 45 to allow predetermined outputs from the interactive display 35, the processor 25, the internal interface means 143, the signal convertor 27 and the output power unit 45 to pass to the local memory 29 where predetermined outputs are stored in the local memory 29 as a plurality of predetermined data and to allow retrieval of the stored predetermined data in the local memory 29 by the interactive display 35, the processor 25, the internal interface means 143, the signal convertor 27 and the output power unit 45. The local memory 29 includes at least a knowledge file and a history file where at least part of the predetermined data is stored. The processor 25 having a learning algorithm to perform a predetermined adaptive analysis using predetermined inputs, such as predetermined inputs from the interactive display 35, the internal interface means 143, the signal convertor 27 and the output power unit 45 as local inputs 169 or predetermined inputs from remote sites 145 like meteorological inputs 139 from weather websites as remote inputs 173, and using predetermined data, such as predetermined data from outputs from the interactive display 35, the internal interface means 143, the signal convertor 27 and the output power unit 45 as local data 167, predetermined data retrieved from the local memory 29 or predetermined data from outputs from remote sites 145 as remote data 171, so that said processor 25 develops a plurality of system module control commands 133. The system module control commands 133 are passed from the processor 25 to the interactive display, to the internal interface means 143 and to the output power unit 45 to control all the systems of the protection system 1 to manage the possible effects of predetermined environmental conditions on facilities or equipment. Each application could have a unique operating algorithm to optimize its operation. Each system would be managed by the system module 3 or manually over-ridden by the operator, for example at the local interactive display 35 or remote location using remote manual intervention such as a 24 hour/day alarm or monitoring service. The internal interface means 143 further comprises a local area network device 153, a wireless local area network device 41 or a modem 37. The remote override may have a time period (such as 4 hours) after which control is returned to the local control module 91 with default or override settings.

As seen in FIG. 7, the system module 3 has a power unit 31 being connected to the external electrical control power source 5 by a control energy supply system 147 to provide electrical energy to the system module 3. The power unit 31 is connected to the interactive display 35, the processor 25, the local memory 29, the internal interface means 143, the signal convertor 27 and the output power unit 45 to allow electrical energy to flow from the external electrical control power source 5 to the power unit 31 and from the power unit 31 to the interactive display 35, the processor 25, the local memory 29, the internal interface means 143, the signal convertor 27 and the output power unit 45 such that the power unit 31 provides electrical energy to operate the system module 3. The system module 3 also has a back-up battery 33 that provides electrical energy to operate the system module 3 when the external electrical control power source 5 is not available. FIG. 7 also shows the output power unit 45 being connected to the external electrical heater power source 47 by an energy supply system 137 to provide electrical energy to the electrical heating system 104 to produce the heat used to protect facilities or equipment. The energy supply system 137 further comprises a heater electric supply system 106.

The protective system 1 shown in FIG. 7 further comprises a sensing means 127 where the sensing means 127 monitors for predetermined environmental conditions, converts the detected predetermined environmental conditions into a plurality of predetermined sensing means data signals 129 and transmits these sensing means data signals 129 to the system module 3 by the interconnecting means 131. The protective system 1 shown in FIG. 7 further comprises a heating means 103, the heating means 103 having a predetermined arrangement and being received in predetermined locations such that the heating means 103 provides desired protection in response to predetermined environmental conditions or the prediction of a predetermined environmental condition occurring within a predetermined time. The heating means further comprises an electric heating system 104 or a hydronic heating system 111. The protective system 1 further comprises a control system means 95, the control system means 95 having a predetermined arrangement and being received in predetermined locations such that the control system means 95 provides desired protection in response to predetermined environmental conditions or the prediction of a predetermined environmental condition occurring within a predetermined time. The control system means 95 further comprises a heater control panel 91 and a satellite controller 93. The protective system 1 shown in FIG. 7 further comprises an external interface means 35, the external interface means 15 being connected to a plurality of remote sites 145 to provide communication between the system module 3 and remote sites 145 through the external interface means 15 to allow predetermined inputs as remote inputs 173 and predetermined outputs as remote data 171 to pass between the system module 3 and the remotes sites 145.

The protective system 1 shown in FIG. 7 further comprises an interconnection means 131. The interconnection means 131 further comprises a wired phone line 23, wired cable system 149, a wireless system 151, and a combination of the wired cable system 149 and the wireless system 151. The wired cable system 149 is either directly connected to system protection system components or is connected to a local area network device 153 and a local area network router 155. The wired phone line 23 is connected to a modem 37. The wireless system 151 further comprises a wireless radio system connected to a wireless local area network device 41 and a wireless local area network router 43 or a cellular system connected to a cellular phone not shown. The interconnection means 131 connects the sensing means 127 to the internal interface means 143 to provide communication between the sensing means 127 and the internal interface means 143 to allow the predetermined sensing means data signals 129 and to allow predetermined outputs to pass between the sensing means 127 and the internal interface means 143 where the internal interface means 143 passes the predetermined sensing means data signals 129 to the signal convertor 27 so that the signal convertor 27 can convert the predetermined sensing means data signals 129 into predetermined inputs. The interconnection means 131 also connects the heating means 103 to the internal interface means 143 to provide communication between the heating means 103 and the internal interface means 143 to allow the system module control commands 133 to be passed from the internal interface means 143 to the heating means 103 and to allow the predetermined inputs and the predetermined outputs to pass between the internal interface means 143 and the heating means 103. The interconnection means 131 also connects the control system means 95 to the internal interface means 143 to provide communication between the control system means 95 and the internal interface means 143 to allow the system module control commands 133 to be passed from the internal interface means 143 to the control system means 95, and to allow the predetermined inputs and the predetermined outputs to pass between the internal interface means 143 and the control system means 95 so that the control system means 95 can manage a plurality of control components to provide desired protection in response to the system module control commands 133 from the processor 25 through the internal interface means 143 and the interconnection means 131, and so that the control system means 95 can receive inputs and provide outputs to the system module 3 through the internal interface means 143 and the interconnection means 131. The interconnection means 131 also connects the external interface means 15 to the internal interface means 143 to provide communication between the internal interface means 143 and the external interface means 15 to allow predetermined inputs and predetermined outputs to pass between external interface means 15 and the internal interface means 143. The external interface means 15 connects to the remote sites 145 to provide communication between the external interface means 15 and the remote sties 145 to allow predetermined inputs as remote inputs 173 and predetermined outputs as remote data 171 to pass between the remote sites 145 and the external interface means 15. The internal interface means 143, the interconnection means 131, the external interface means 15 and the remote sites 145 cooperate to allow remote inputs 173 and remote data 171 to pass between the remote sites 145 and the system module 3.

The protective system 1 shown in FIG. 7 further comprises an energy supply system 137. The energy supply system 137 connects the heating means 103 to the external energy source 135 to allow the energy from the external energy source 135 to be delivered to the heating means 103 where the heating means 103 converts the energy into heat to provide desired protection in response to the system module control commands 133 from the processor 25 to the output power unit 45 in order to provide desired protection in response to predetermined environmental conditions or the prediction of a predetermined environmental condition occurring within a predetermined time. As shown in FIG. 7, the external energy source 135 further comprises an external electrical heater power source 47, the energy supply system 137 further comprises a heater electric supply system 106 and the heating means 103 further comprises an electrical heating system 104. The external electrical heater power source 47 is connected to the output power unit 45 in the system module 3 by the heater electric supply system 106, and the output power unit 45 is connected to the electrical heating system 104 by the heater electric supply system 106 to provide the energy from the external heater power source 47 to the electrical heating system 104.

The protective system 1 shown in FIG. 7 further comprises an external interface means 15, the external interface means 15 being connected to a plurality of remote sites 145 to provide communication between the system module 3 and remote sites 145 through the external interface means 15 to allow predetermined inputs and predetermined outputs to pass between system module 3 and the remotes sites 145. The external interface means further comprises a local area network server 155 and a wireless local area network router 43. The protection system 1 shown in FIG. 7 wherein the internal interface means 143 further comprises a local area network device 153 and wherein the external interface means 15 further comprises a local area network server 155 where the local area network device 153 provides communication between the system module 3 and the sensing means 127 over the interconnection means 131, where the local area network device 153 provides communication between the system module 3 and the heating means 103 over the interconnection means 131 and where the local area network device 153 is connected to the local area network server 155 by the interconnection means 131 so that the local area network device 153 and the local area network server 155 cooperate to provide communication between the system module 3 and the remote sites 145. The protection system 1 shown in FIG. 7 wherein the internal interface means 143 further comprises a wireless local area network device 41 and wherein the external interface means 15 further comprises a wireless local area network router 43 where the wireless local area network device 41 provides communication between the system module 3 and the sensing means 127, where the wireless local area network device 41 provides communication between the system module 3 and the heating means 103, where the wireless local area network device 41 provides communication between the system module 3 and the control system means 95, and where the wireless local area network device 41 is connected to the wireless local area network router 43 so that the wireless local area network device 41 and the wireless local area network router 43 cooperate to provide communication between the system module 3 and the remotes sites 145. The protection system 1 shown in FIG. 7 wherein the internal interface means 143 further comprises a modem 37 where the modem 37 provides communication between the system module 3 and the sensing means 127, between the system module 3 and the heating means 103, between the system module 3 and the control system means 95 and between the system module 3 and the remote sites 145 through the external interface means 15 over the wired phone line 23.

The protective system 1 shown in FIG. 7 further comprises a heating means 103 where the heating means 103 having a predetermined arrangement and being received in predetermined locations such that the heating means 103 provides desired protection in response to predetermined environmental conditions or the prediction of a predetermined environmental condition occurring within a predetermined time. The heating means 103 shown in FIG. 7 further comprises an electric heating system 104 where the external energy source 135 comprises an external electrical heater power source 47 and where the energy supply system 137 further comprises a heater electric supply system 106 such that the electric heating system 104 uses electrical energy to provide heat in response to the system module control commands 133 from the processor 25 to the output power unit 45 in order to provide desired protection in response to predetermined environmental conditions.

Figure 8:
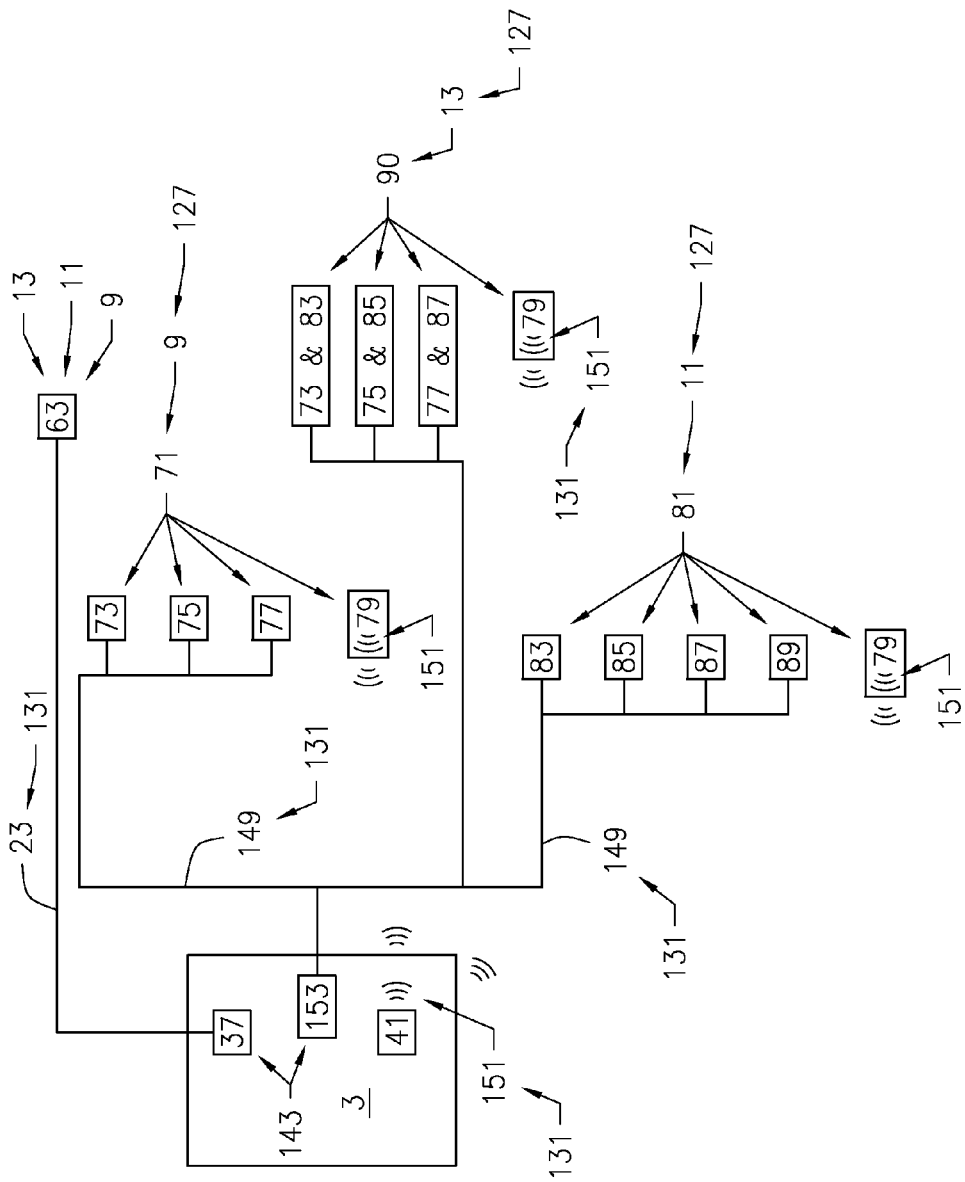
FIG. 8 is partial schematic illustration of the overall adaptive freeze, snow or ice protection system of the present invention shown in FIG. 6 that shows snow sensors, ice sensors and combined snow and ice sensors.

FIG. 8 shows another embodiment of the protection system 1 with additional details on the sensing means 127. The sensing means 127 having a predetermined arrangement and being received in predetermined locations such that the sensing means 127 monitors for predetermined environmental conditions, converts the detected predetermined environmental conditions into a plurality of predetermined sensing means data signals 129 and transmits these sensing means data signals 129 to the system module 3 by the interconnecting means 131. The sensing means 127 shown in FIG. 8 further comprises a snow sensing means 9, an ice sensing means 11 and a combined snow and ice sensing means 13 where the snow sensing means 9, the ice sensing means 11 or the combined snow and ice sensing means 13 monitors for the predetermined environmental conditions of freezing conditions, snowing conditions, icing conditions or any combination thereof and converts these predetermined environmental conditions into a plurality of predetermined sensing means data signals 129 that are sent back to the system module 3 by the interconnecting means 131 such as a wired phone line 23, a wired cable system 149 or a wireless system 151. The snow sensing means 9 further comprises a snow sensor 71 and an optical detection means 63. The snow sensor 71 further comprises an aerial snow sensor 73, a gutter snow sensor 75, a pavement snow sensor 77 and a flexible strain gauge sensor 79. The ice sensing means 11 further comprises an ice sensor 81 and an optical detection means 63. The ice sensor 81 further comprises an aerial ice sensor 83, a gutter ice sensor 85, pavement ice sensor 87 and a flexible strain gauge sensor 79. The combined snow and ice sensing means 13 further comprises a combined snow and ice sensor 90 and an optical detection means 63. The combined snow and ice sensor 90 further comprises an aerial snow sensor 73 and an aerial ice sensor 83, a gutter snow sensor 75 and a gutter ice sensor 85, a pavement snow sensor 77 and a pavement ice sensor 87, and a flexible strain gauge sensor 79. Examples of the combined snow and ice sensor 90 are made by Environmental Technology Inc., model CIT-1 aerial ice and snow sensor, model GIT-1 gutter ice and snow sensor, and model SIT-6E pavement ice and snow sensor. An example of the flexible strain gauge sensor 79 is the Biomimetic Systems Laboratory strain gauge which they refer to as a pressure-sensing membrane.

FIG. 9 shows another embodiment of the protection system 1 with additional details on the heating means 103 and the control system means 95. The heating means 103 further comprises an electrical heating system 104. The external electrical heater power source 47 provides electrical energy to the heating means 103 over the heater electric supply system 106. The electrical heating system 104 further comprises a heater control panel 91, a satellite controller 93, electric heating cables 105, electric heat mats 107 and electric heating fixtures 109. The electric heating cables 105 can be wrapped around liquid piping systems 117 or around equipment to provide protection. The electric heat mats 107 can be placed on stairs or walkways to melt ice and snow. The electric heating fixtures 109 can be placed on the edges of roofs to melt ice and snow. The system module 3 sends system module control commands 133 to the control system means 95 over the wired cable system 149. The control system means 95 further comprises at least one solenoid valve 101, a relay unit 97 within a heater control panel 91 or a satellite controller 93 and a proportional power management unit 99 within a heater control panel 91 or a satellite controller 93. The amount of electric energy used by the heating means 103 can be proportioned based on the ambient temperature. By providing the system module 3 with the information on the minimum ambient temperature in a regional area and the information on the heating means 103 capabilities, and by storing this data in the local memory 29 of the system module 3, the system module 3 can use this data, along with other data and inputs, to control the heating means 103 so that the heater energy would be proportioned linearly over a range of energy usage where one end of the energy range would be to turn the energy off, for example at 36 degrees Fahrenheit, and the other end of the energy range would be to turn the energy on 100% or full on, for example at the ambient of −40 degrees Fahrenheit. The proportioning of the power could be accomplished by cycling contactors, by using silicon controlled rectifiers or by equivalent methods. This approach will reduce the energy usage while providing protection for the facility.

The invention also includes a method of operation 175 of the protection system 1 that is executed by the processor 25 where freezing conditions, snowing conditions, icing conditions or any combination thereof are environmental conditions that the protection system 1 provides protection from. The protection system 1 comprises a system module 3, a sensing means 127, a heating means 103, a control means 95, an interconnection means 131 and an external interface means 15 where said system module 3 comprises a processor 25, an internal interface means 143 and a local memory 29 where local memory 29 has a knowledge file with knowledge file data and a history file with history file data. The protection system 1 comprises a plurality of predetermined inputs comprising a plurality of predetermined local inputs 169 and a plurality of predetermined remote inputs 173. The protection system 1 has a plurality of predetermined data comprising a plurality of predetermined local data 167 and a plurality of predetermined remote data 171. The protection system 1 is supplied with an external energy source 135, with an external electrical control power source 5 and with a reliability factor where the method of operation 175 comprises the following steps: (1) Step 177—starting method of operation; (2) Step 179—setting the reliability factor; (3) Step 181—obtaining existing environmental condition from sensing means 127; (4) Step 183—comparing existing environmental condition to predetermined environmental conditions; (5) Step 201—obtaining local data 167; (6) Step 203—obtaining local inputs 169; (7) Step 205—obtaining remote inputs 173; (8) Step 207—obtaining remote data 171; (9) Step 195—comparing local inputs 169 and remote inputs 173 with predetermined environmental conditions, with updated knowledge file and with updated history file; (10) Step 187—performing adaptive analysis; (11) Step 197—obtaining data from the processor 25 to update history file in the local memory 29 and providing undated history file from the local memory 29 to be used in comparing local inputs 169 and remote inputs 173 with predetermined environmental conditions, with updated knowledge file and with updated history file in step in 195; (12) Step 199—obtaining data from the processor 25 to update knowledge file in the local memory 29 and providing updated knowledge file from the local memory 29 to be used in the comparing of local input 169 and remote inputs 173 with predetermined environmental conditions, with updated knowledge file and with updated history file in step in 195; (13) Step 189—sending the system module control commands 133 to a heater means 103 to control the heat produced by the heating means 103 in order to provide desired protection in response to predetermined environmental conditions; (14) Step 191—sending the system module control commands 133 to a control system means 95 so that the control system means 95 can control the heat produced by the heating means 103 in response to the system module control commands 133 in order to provide desired protection in response to predetermined environmental conditions; and (15) Step 193—ending and resetting method of operation for the next operation in response to determining that a no-match result has occurred from the comparison of existing environmental conditions to predetermined environmental conditions or to the sending of said system module control commands 133.

The starting method of operation step 177 could be initialed either when the protective system 1 is powered up or when manually started locally or remotely. An example of manually starting the protective system would be the pressing of a button not shown. The setting the reliability factor step 179 can be accomplished by entering the reliability factor into the protective system locally, for example by using the local interactive display 35 or a key pad not shown, or remotely, for example by the remote control means 19 through the external interface means 15. The reliability factor would be a predetermined digital input that tells the protective system how much of the time it must provide 100% satisfactory operational results. The obtaining existing environmental conditions from a sensing means step 181 is accomplished by using one of prior described sensing means 127 that provides the existing environmental conditions to the protective system 1. The comparing existing environmental conditions to predetermined environmental conditions step 183 is accomplished by comparing the environmental condition input, developed by the internal interface means 143 based upon the sensing means data signals 129 received from the sensing means 127, to predetermined environmental conditions data stored in the local memory 29 of the system module 3. If a match occurs between the existing environmental conditions input and the predetermined environmental conditions data, then this information is provided to the processor 25 to be used as part of the adaptive analysis in step 187 from step 183. If a match between the existing environmental conditions input and the predetermined environmental conditions data does not occur, then the preferred embodiment would provide the no-match input from step 183 to the end and reset step 193. The obtaining local data 167 step 201 and the obtaining local inputs 169 step 203 are accomplished by using the internal interface means 143 via the interconnecting means 131 to connect to one or more local devices such as the sensing means 127, the local interactive display 35, the heating means 103 or the control system means 95 with the system module 3. The obtaining remote inputs 173 step 205 and the obtaining remote data 171 step 207 are accomplished by using the external interface means 15 via the interconnecting means 131 to connect one or more remote sites 145 with the system module 3. The comparing local input 169 and remote inputs 173 with predetermined environmental conditions, with updated knowledge file and with updated history file step 195 is accomplished by comparing the local input 169 and remote inputs 173 to predetermined environmental conditions data, with updated knowledge file and with updated history file stored in the local memory 29 of the system module 3. The results of the comparison of the local inputs 169 and remote inputs 173 to predetermined environmental conditions data, with updated knowledge file and with updated history file information is provided to the processor 25 to be used as part of the adaptive analysis. The protective system 1 learns from the local inputs 169 and remote inputs 173 by storing new data in the local memory 29. The performing adaptive analysis step 187 is accomplished by the processor 25 using the learning algorithm to perform a predetermined adaptive analysis using existing environmental condition when the existing environmental condition matches one of the predetermined environmental conditions; using comparison of local inputs 169 and remote inputs 173 with predetermined environmental conditions, with updated knowledge file and with updated history file; using predetermined data from the local memory 29 for both local data 167 and remote data 171; using the predetermined local inputs 169 and using predetermined remote inputs 173 so that the processor 25 develops a plurality of system module control commands 133. The obtaining of data from the processor 25 to update history file in the local memory 29 and providing updated history file from the local memory 29 to be used in the comparing of local inputs 169 and remote inputs 173 with predetermined environmental conditions, with updated knowledge file and with updated history file step 197 is accomplished by the processor 25 sending predetermined outputs to the local memory 29 where predetermined outputs are stored as a plurality of predetermined data in the history file of the local memory 29 to update the history file and providing the updated history file from the local memory 29 so that it can be compared to local inputs 169 and remote inputs 173. The data in the history file is used to update predetermined environmental conditions used to compare to local inputs 169 and remote inputs 173 by the processor 25. The obtaining of data from the processor 25 to update the knowledge file in the local memory 29 and the providing of the updated knowledge file from the local memory 29 to be used in the comparing of local input 169 and remote inputs 173 with predetermined environmental conditions, with updated knowledge file and with updated history file step 199 are accomplished by the processor 25 sending predetermined outputs to the local memory 29 where predetermined outputs are stored as a plurality of predetermined data in the knowledge file of the local memory 29 to update the knowledge file and providing the updated knowledge file from the local memory 29 so that it can be compared to local inputs 169 and remote inputs 173. The data in the knowledge file is used to update predetermined environmental conditions used to compare to local inputs 169 and remote inputs 173 by the system module 3. The sending of the system module control commands 133 to a heater means 103 to control the heat produced by said heating means 103 in order to provide desired protection in response to predetermined environmental conditions step 189 is accomplished by the system module 3 sending the system module control commands 133 developed by the processor 25 to the heating means 103 via the interconnecting means 131 to manage the possible effects of predetermined environmental conditions on facilities or equipment. The sending of said system module control commands 133 to a control system means 95 so that said control system means 95 can manage a plurality of control components in response to said system module control commands 133 to provide desired protection in response to predetermined environmental conditions step 191 is accomplished by the module 3 sending the system module control commands 133 developed by the processor 25 to the control system means 95 via the interconnecting means 131 to manage the possible effects of predetermined environmental conditions on facilities or equipment. The ending and resetting method of operation for the next operation step 193 is accomplished by the system module 3 in response to receiving a plurality of inputs of which three inputs would be from step 183, from step 189 and from step 191. The input from step 183 would be due to a no-match of existing environmental conditions input to any of the predetermined environmental conditions data. The input from step 189 would be due to the module 3 sending the system module control commands 133 developed by the processor 25 to the control system means 95. The input from step 191 would be due to the module 3 sending the system module control commands 133 developed by the processor 25 to the heating means 103. Upon receiving the proper input, step 193 would end the method of operation and reset the method of operation to run again.

FIG. 10 shows an alternative method of operation 175 of the protection system 1 that is executed by the processor 25 where freezing conditions, snowing conditions, icing conditions or any combination thereof are environmental conditions that the protection system 1 provides protection from. The protection system 1 comprising a system module 3, a sensing means 127, a heating means 103, a control means 95, an interconnection means 131 and an external interface means 15 where said system module 3 comprises a processor 25, an internal interface means 143 and a local memory 29 where local memory 29 having a knowledge file with knowledge file data and a history file with history file data. The protection system 1 has a plurality of predetermined inputs comprising a plurality of predetermined local inputs 169 and a plurality of predetermined remote inputs 173. The protection system 1 having a plurality of predetermined data comprising a plurality of predetermined local data 167 and a plurality of predetermined remote data 171. The protection system 1 being supplied with an external energy source 135, with an external electrical control power source 5 and with a reliability factor where the method of operation 175 comprises the following steps: (1) Step 177—starting method of operation; (2) Step 179—setting the reliability factor; (3) Step 181—obtaining existing environmental condition from a sensing means 127; (4) Step 183—comparing existing environmental conditions to predetermined environmental conditions; (5) Step 185—obtaining predictive meteorological inputs 130; (6) Step 201—obtaining local data 167; (7) Step 203—obtaining local inputs 169; (8) Step 205—obtaining remote inputs 173; (9) Step 207—obtaining remote data 171; (10) Step 195—comparing local inputs 169 and remote inputs 173 with predetermined environmental conditions, with updated knowledge file and with updated history file; (11) Step 187—performing adaptive analysis; (12) Step 197—obtaining data from the processor 25 to update history file in the local memory 29 and providing updated history file from the local memory 29 to be used in the comparing of local inputs 169 and remote inputs 173 with predetermined environmental conditions, with updated knowledge file and with updated history file in step 195; (13) Step 199—obtaining data from the processor 25 to update knowledge file in the local memory 29 and providing updated knowledge file from the local memory 29 to be used in the comparing of local inputs 169 and remote inputs 173 with predetermined environmental conditions, with updated knowledge file and with updated history file in step 195; (14) Step 189—sending said system module control commands 133 to a heater means 103 to control the heat produced by said heating means 103 in order to provide desired protection in response to predetermined environmental conditions; (15) Step 191—sending the system module control commands 133 to a control system means 95 so that the control system means 95 can control the heat produced by the heating means 103 in response to the system module control commands 133 in order to provide desired protection in response to predetermined environmental conditions; and (16) Step 193—ending and resetting the method of operation for the next operation in response to determining that there is no likelihood of predetermined environmental conditions occurring within a predetermined time or to the sending of said system module control commands 133.

The alternative embodiment, shown in FIG. 10, further comprises obtaining predictive meteorological inputs step 185. The obtaining predictive meteorological inputs step 185 is performed after the comparing existing environmental condition to predetermined environmental conditions step 183 and before the ending and resetting method of operation for the next operation step 193. If a no-match from the comparison of existing environmental condition to predetermined environmental conditions step 183 occurs, then predictive meteorological inputs 139 are obtained so that the likelihood of a predetermined environmental condition occurring within a predetermined time is determined. The obtaining predictive meteorological inputs step 185 is accomplished by the system module 3 obtaining predictive meteorological inputs from remote sites 145 like the weather data sites 157. If the system module 3 determines that the predictive meteorological inputs 139 indicate a likelihood of a predetermined environmental condition occurring within a predetermined time, then the performing adaptive analysis step 187 further includes the additional alternative requirement of performing adoptive analysis by said processor 25 to determine the system module control commands 133 in response to the predictive meteorological inputs 139 indicating a likelihood of a predetermined environmental condition occurring within a predetermined time. In the alternate embodiment, the ending and resetting method of operation for the next operation step 193 is accomplished by the module 3 in response to receiving a plurality of inputs of which three inputs would be from step 185, from step 189 and from step 191. The input from step 185 would be due to a no-likelihood of a predetermined environmental condition occurring within a predetermined time. The input from step 189 would be due to the system module 3 sending the system module control commands 133 developed by the processor 25 to the control system means 95. The input from step 191 would be due to the system module 3 sending the system module control commands 133 developed by the processor 25 to the heating means 103. Upon receiving the proper input, step 193 would end the method of operation and reset the method of operation to run again.

Whereas, the devices and methods have been described in relation to the drawings and claims, it should be understood that other and further modifications, apart from those shown or suggested herein, may be made within the spirit and scope of this invention.

What is claimed is:

1. An adaptive freeze, snow or ice protection system where freezing conditions, snowing conditions, icing conditions or any combination thereof are environmental conditions that said protection system provides protection from, said protection system being supplied with an external energy source, said protection system comprising:

a system module, said system module having an internal interface means, a processor and a local memory, said internal interface means being interconnected to said processor to provide communication between said processor and said internal interface means to allow a plurality of predetermined inputs and a plurality of predetermined outputs to pass between said processor and said internal interface means, said local memory being interconnected to said internal interface means to provide communication between said local memory and said internal interface means to allow predetermined outputs from said internal interface means to pass to said local memory where the predetermined outputs are stored as a plurality of predetermined data in said local memory and to allow retrieval of the predetermined data from said local memory by said internal interface means, said local memory being interconnected to said processor to provide communication between said local memory and said processor to allow predetermined outputs from said processor to pass to said local memory where the predetermined outputs are stored as a plurality of predetermined data in said local memory and to allow retrieval of the predetermined data from said local memory by said processor, said processor having a learning algorithm to perform a predetermined adaptive analysis using the predetermined data and using predetermined inputs so that said processor develops a plurality of system module control commands where said system module control commands are passed from said processor to said internal interface means, a sensing means, said sensing means having a predetermined arrangement and being received in predetermined locations such that said sensing means monitors for predetermined environmental conditions and converts the detected predetermined environmental conditions into a plurality of predetermined sensing means data signals, a heating means, said heating means having a predetermined arrangement and being received in predetermined locations such that said heating means provides desired protection in response to predetermined environmental conditions, a control system means, said control system means having a predetermined arrangement and being received in predetermined locations such that said control system means controls said heating means to provide desired protection in response to predetermined environmental conditions, an interconnection means, said interconnection means connects said sensing means to said internal interface means to provide communication between said sensing means and said internal interface means to allow said predetermined sensing means data signals and to allow predetermined outputs to pass between said sensing means and said internal interface means where said interface means converts sensing means data signals into predetermined inputs, and said interconnection means connects said heating means to said internal interface means to provide communication between said heating means and said internal interface means to allow said system module control commands, to allow said predetermined inputs and to allow said predetermined outputs to pass between said internal interface means and said heating means, and said interconnection means connects said control system means to said internal interface means to provide communication between said control system means and said internal interface means to allow said system module control commands, to allow said predetermined inputs and to allow said predetermined outputs to pass between said internal interface means and said control system means, and an energy supply system, said energy supply system connects said heating means to the external energy source to allow the energy from the external energy source to be delivered to said heating means where said heating means converts the energy into heat to provide desired protection in response to said system module control commands, whereby said system module receives the predetermined sensing means data signals from said sensing means via said interconnection means and said internal interface means, whereby the predetermined sensing means data signals are converted into predetermined inputs to be used by said processor and to be saved in said local memory as predetermined data, whereby the system module control commands are sent from said system module to said heating means via said internal interface means and said interconnection means to control the heat produced by said heating means with the energy from the external energy source that is provided to said heating means through said energy supply system in order to provide desired protection in response to predetermined environmental conditions, whereby the system module control commands are sent from said system module to said control system means via said internal interface means and said interconnection means so that said control system means can control said heating means in response to said system module control commands to provide desired protection in response to predetermined environmental conditions, and whereby said processor sends predetermined outputs to said internal interface means to provide status of said protection system.

2. The protection system of claim 1 wherein said protection system further comprises an external interface means, said external interface means being connected to a plurality of remote sites to provide communication between said external interface means and said remote sites to allow predetermined inputs and predetermined outputs to pass between external interface means and said remotes sites, and being interconnected to said internal interface means by said interconnection means to provide communication between said internal interface means and said external interface means to allow predetermined inputs and predetermined outputs to pass between said external interface means and said internal interface means whereby predetermined inputs and predetermined outputs are allowed to pass between said protection system and said remote sites.

3. The protection system of claim 2 wherein said remote sites further comprises weather data sites such that said external interface means provides communication with said weather data sites to allow a plurality of predetermined meteorological inputs as predetermined inputs and to allow predetermined outputs to pass between said weather data sites and said external interface means wherein said processor having the learning algorithm to perform predetermined adaptive analysis such that said processor further uses predetermined meteorological inputs received from said weather data sites in addition to using predetermined inputs received from said internal interface means and using predetermined data retrieved from said local memory to develop said system module control commands in response to predetermined environmental conditions or in response to the prediction or a predetermined environmental condition occurring within a predetermined time.

4. The protection system of claim 2 wherein said remote sites further comprises remote camera sites and remote camera control sites such that said external interface means provides communication with said remote camera sites and said remote camera control sites to allow a plurality of predetermined remote camera inputs and a plurality of predetermined remote camera control site inputs as predetermined inputs and to allow predetermined outputs to pass between said remote camera sites and said remote camera control sites and said external interface means wherein said processor having the learning algorithm to perform predetermined adaptive analysis such that said processor further uses predetermined remote camera site inputs and remote camera control site inputs received from said remote camera sites and said remote camera control sites in addition to using predetermined inputs received from said internal interface means and using predetermined data retrieved from said local memory to develop said system module control commands.

5. The protection system of claim 2 wherein said remote sites further comprises a dedicated building management system such that said external interface means provides communication with said dedicated building management system to allow a plurality of predetermined building inputs as predetermined inputs and to allow predetermined outputs to pass between said dedicated building management system and said external interface means wherein said processor having the learning algorithm to perform predetermined adaptive analysis such that said processor further uses predetermined building inputs received from said dedicated building management system in addition to using predetermined inputs received from said internal interface means and using predetermined data retrieved from said local memory to develop said system module control commands.

6. The protection system of claim 2 wherein said remote sites further comprises a remote monitoring station such that said external interface means provides communication with said remote monitoring station to allow a plurality of predetermined remote monitoring station inputs as predetermined inputs and to allow predetermined outputs to pass between said remote monitoring station and said external interface means wherein said processor having the learning algorithm to perform predetermined adaptive analysis such that said processor further uses predetermined remote monitoring station inputs received from said remote monitoring station in addition to using predetermined inputs received from said internal interface means and using predetermined data retrieved from said local memory to develop said system module control commands.

7. The protection system of claim 2 wherein said remote sites further comprises microprocessor based devices such that said external interface means provides communication with said microprocessor based devices to allow a plurality of predetermined microprocessor based device inputs as predetermined inputs and to allow predetermined outputs to pass between said microprocessor based devices and said external interface means wherein said processor having the learning algorithm to perform predetermined adaptive analysis such that said processor further uses predetermined microprocessor based device inputs received from said microprocessor based devices in addition to using predetermined inputs received from said internal interface means and using predetermined data retrieved from said local memory to develop said system module control commands.

8. The protection system of claim 2 wherein said sensing means further comprises an optical detection means, a freeze sensing means, a snow sensing means, an ice sensing means or a combined snow and ice sensing means where said optical detection means, said freeze sensing means, said snow sensing means, said ice sensing means or said combined snow and ice sensing means monitors for the predetermined environmental conditions of freezing conditions, snowing conditions, icing conditions or any combination thereof and converts predetermined environmental conditions into said plurality of predetermined sensing means data signals.

9. The protection system of claim 8 wherein said optical detection means further comprises a camera system, a night vision camera system, an infrared camera system, a video camera system or an infrared video camera system to determine the presence of predetermined environmental conditions.

10. The protection system of claim 2 wherein said interconnection means further comprises a wired cable system and a wireless system, where the combination of said wired cable system and said wireless system cooperate to connect said system module to said sensing means, to connect said system module to said control system means, to connect said system module to said heating means and to connect said system module to said external interface means.

11. The protection system of claim 2 wherein said internal interface means further comprises a local area network device and wherein said external interface means further comprises a local area network server where said local area network device and said local area network server cooperate to provide communication over said interconnection means between said system module and said remote sites, and where said local area network device provides communication over said interconnection means between said system module and said sensing means, between said system module and said control system means, and between said system module and said heating means.

12. The protection system of claim 2 wherein said internal interface means further comprises a wireless local area network device and wherein said external interface means further comprises a wireless local area network router where said wireless local area network device and said wireless local area network router cooperate to provide communication over said interconnection means between said system module and said remotes sites, and where said wireless local area network device provides communication over said interconnection means between said system module and said sensing means, between said system module and said control system means and between said system module and said heating means.

13. The protection system of claim 2 wherein said internal interface means further comprises a modem and said interconnecting means further comprises a plurality of wired phone lines where said modem and said wired phone lines cooperate to provide communication between said system module and said sensing means, between said system module and said control system means, between said system module and said heating means and between said system module and said external interface means where said external interface means allows communications with said remote sites.

14. The protection system of claim 1 wherein said sensing means further comprises an optical detection means, a freeze sensing means, a snow sensing means, an ice sensing means or a combined snow and ice sensing means.

15. The protection system of claim 14 wherein said optical detection means further comprises a camera system, a night vision camera, an infrared camera system, a video camera system or an infrared video camera system to determine the presence of predetermined environmental conditions.

16. The protection system of claim 1 wherein said heating means further comprises a hydronic heating system where the external energy source comprises a reservoir of heat transfer fluid and where said energy supply system further comprises a liquid piping system such that said hydronic heating system heats the heat transfer fluid and circulates it through said liquid piping system to provide heat in response to said system module control commands from said processor in order to provide desired protection in response to predetermined environmental conditions.

17. The protection system of claim 1 wherein said heating means further comprises an electric heating system where the external energy source comprises an external electrical heater power source and where said energy supply system further comprises a heater electric supply system such that said electric heating system uses electrical energy to provide heat in response to said system module control commands from said processor in order to provide desired protection in response to predetermined environmental conditions.

18. The protection system of claim 1 wherein said interconnection means further comprises a wired cable system to connect said system module to said sensing means, to connect said system module to said control system means and to connect said system module to said heating means.

19. The protection system of claim 1 wherein said interconnection means further comprises a wireless system to connect said system module to said sensing means, to connect said system module to said control system means and to connect said system module to said heating means.

20. The protection system of claim 19 wherein said internal interface means further comprises a wireless local area network device where said wireless local area network device and said wireless system cooperate to provide communication between said system module and said sensing means, between said system module and control system means and between said system module and said heating means.

21. The protection system of claim 1 wherein said interconnection means further comprises a wired cable system and a wireless system, where the combination of said wired cable system and said wireless system cooperate to connect said system module to said sensing means, to connect said system module to said control system means and to connect said system module to said heating means.

22. The protection system of claim 1 wherein said internal interface means further comprises a local area network device where said local area network device provides communication over said interconnection means between said system module and said sensing means, between said system module and said control system means, and between said system module and said heating means.

23. An adaptive freeze, snow or ice protection system where freezing conditions, snowing conditions, icing conditions or any combination thereof are environmental conditions that said protection system provides protection from, said protection system being supplied with an external energy source and with an external electrical control power source, said protection system comprising:

a system module, said system module having an interactive display, a processor, a local memory, an internal interface means, a signal converter, a power unit and an output power unit, said interactive display, said processor, said internal interface means, said signal convertor and said output power unit being interconnected to provide communication between said interactive display, said processor, said internal interface means, said signal convertor and said output power unit to allow a plurality of predetermined inputs and a plurality of predetermined outputs to pass between said interactive display, said processor, said internal interface means, said signal convertor and said output power unit, said local memory being interconnected to said interactive display, to said processor, to said internal interface means, to said signal convertor and to said output power unit to provide communication between said local memory and said interactive display, said processor, said internal interface means, said signal convertor and said output power unit to allow predetermined outputs from said interactive display, said processor, said internal interface means, said signal convertor and said output power unit to pass to said local memory where predetermined outputs are stored as a plurality of predetermined data in said local memory and to allow retrieval of predetermined data from said local memory by said interactive display, said processor, said internal interface means, said signal convertor and said output power unit, said processor having a learning algorithm to perform a predetermined adaptive analysis using predetermined inputs and using predetermined data so that said processor develops said system module control commands, said power unit being connected to the external control power source and being connected to said interactive display, said processor, said local memory, said internal interface means, said signal convertor and said output power unit to allow electrical energy to flow from the external electrical control power source to said power unit and from said power unit to said interactive display, said processor, said local memory, said internal interface means, said signal convertor and said output power unit such that said power unit provides electrical energy to operate said system module, a sensing means, said sensing means having a predetermined arrangement and being received in predetermined locations such that said sensing means monitors for predetermined environmental conditions and converts the detected predetermined environmental conditions into a plurality of predetermined sensing means data signals, a heating means, said heating means having a predetermined arrangement and being received in predetermined locations such that said heating means provides desired protection in response to predetermined environmental conditions, a control system means, said control system means having a predetermined arrangement and being received in predetermined locations such that said control system means controls said heating means to provide desired protection in response to predetermined environmental conditions, an external interface means, said external interface means being connected to a plurality of remote sites to provide communication between said external interface means and said remote sites to allow predetermined inputs and predetermined outputs to pass between external interface means and said remotes sites, an interconnection means, said interconnection means connects said sensing means to said internal interface means to provide communication between said sensing means and said internal interface means to allow said predetermined sensing means data signals and to allow predetermined outputs to pass between said sensing means and said internal interface means where said internal interface means passes said sensing means data signals to said signal convertor and where said signal converter converts said sensing means data signals into predetermined inputs, said interconnection means connects said heating means to said internal interface means to provide communication between said heating means and said internal interface means to allow said system module control commands to be passed from said internal interface means to said heating means and to allow said predetermined inputs and said predetermined outputs to pass between said internal interface means and said heating means, said interconnection means connects said control system means to said internal interface means to provide communication between said control system means and said internal interface means to allow said system module control commands, to allow said predetermined inputs and to allow said predetermined outputs to pass between said internal interface means and said control system means, and said interconnection means connects said external interface means to said internal interface means to provide communication between said internal interface means and said external interface means to allow predetermined inputs and predetermined outputs to pass between external interface means and said internal interface means, and an energy supply system, said energy supply system connects the external energy source to said output power unit and connects said output power unit to said heating means to allow the energy from the external energy source to be delivered to said heating means where said heating means converts the energy into heat to provide desired protection in response to said system module control commands received by said output power unit in order to provide desired protection in response to predetermined environmental conditions, whereby predetermined inputs and predetermined outputs are allowed to pass between said protection system and said remote sites via said internal interface means, said interconnection means and said external interface means;

whereby said system module control commands are passed from said processor to said local interactive display, to said internal interface means, to said output power unit, whereby the system module control commands are used by said output power unit to determine the amount of regulation said output power unit imposes on the flow of the external energy source to said heating means in order to control the heat produced by said heating means in order to provide desired protection in response to predetermined environmental conditions, whereby the system module control commands are sent from said system module to said control system means via said internal interface means and said interconnection means so that said control system means can control said heating means in response to said system module control commands to provide desired protection in response to predetermined environmental conditions, and whereby said interactive display receives predetermined outputs from said processor, from said internal interface means, from said signal convertor and from said output unit to provide local status of said protection system.

24. The protection system of claim 23 wherein said remote sites further comprises weather data sites such that said external interface means provides communication with the weather data sites to allow a plurality of predetermined meteorological inputs as predetermined inputs and to allow predetermined outputs to pass between said weather data sites and said external interface means wherein said processor having the learning algorithm to perform predetermined adaptive analysis such that said processor further uses predetermined meteorological inputs received from said weather data sites in addition to using predetermined inputs received from said internal interface means and using predetermined data retrieved from said local memory to develop said system module control commands in response to predetermined environmental conditions or in response to the prediction of a predetermined environmental condition occurring within a predetermined time.

25. The protection system of claim 23 wherein said remote sites further comprises remote camera sites and remote camera control sites such that said external interface means provides communication with the remote camera sites and remote camera control sites to allow a plurality of predetermined remote camera inputs and a plurality of predetermined remote camera control site inputs as predetermined inputs and to allow predetermined outputs to pass between said remote camera sites and said remote camera control sites and said external interface means wherein said processor having the learning algorithm to perform predetermined adaptive analysis such that said processor further uses predetermined remote camera site inputs and remote camera control site inputs received from said remote camera sites and said remote camera control sites in addition to using predetermined inputs received from said internal interface means and using predetermined data retrieved from said local memory to develop said system module control commands in response to predetermined environmental conditions.

26. The protection system of claim 23 wherein said remote sites further comprises a dedicated building management system such that said external interface means provides communication with said dedicated building management system to allow a plurality of predetermined building inputs as predetermined inputs and to allow predetermined outputs to pass between said dedicated building management system and said external interface means wherein said processor having the learning algorithm to perform predetermined adaptive analysis such that said processor further uses predetermined building inputs received from said dedicated building management system in addition to using predetermined inputs received from said internal interface means and using predetermined data retrieved from said local memory to develop said system module control commands.

27. The protection system of claim 23 wherein said remote sites further comprises a remote monitoring station such that said external interface means provides communication with said remote monitoring station to allow a plurality of predetermined remote monitoring station inputs as predetermined inputs and to allow predetermined outputs to pass between said remote monitoring station and said external interface means wherein said processor having the learning algorithm to perform predetermined adaptive analysis such that said processor further uses predetermined remote monitoring station inputs received from said remote monitoring station in addition to using predetermined inputs received from internal interface means and using predetermined data retrieved from said local memory to develop said system module control commands.

28. The protection system of claim 23 wherein said remote sites further comprises microprocessor based devices such that said external interface means provides communication with said microprocessor based devices to allow a plurality of predetermined microprocessor based device inputs as predetermined inputs and to allow predetermined outputs to pass between said microprocessor based devices and said external interface means wherein said processor having the learning algorithm to perform predetermined adaptive analysis such that said processor further uses predetermined microprocessor based device inputs received from said microprocessor based devices in addition to using predetermined inputs received from internal interface means and using predetermined data retrieved from said local memory to develop said system module control commands.

29. The protection system of claim 23 wherein said sensing means further comprises an optical detection means, a freeze sensing means, a snow sensing means, an ice sensing means or a combined snow and ice sensing means where said optical detection means, said freeze sensing means, said snow sensing means, said ice sensing means or said combined snow and ice sensing means monitors for the predetermined environmental conditions of freezing conditions, snowing conditions, icing conditions or any combination thereof and converts predetermined environmental conditions into said plurality of predetermined sensing means data signals.

30. The protection system of claim 29 wherein said optical detection means further comprises a camera system, a night vision camera system, an infrared camera system, a video camera system or an infrared video camera system to determine the presence of predetermined environmental conditions.

31. The protection system of claim 23 wherein said heating means further comprises a hydronic heating system where the external energy source comprises a reservoir of heat transfer fluid and where said energy supply system further comprises a liquid piping system such that said hydronic heating system heats the heat transfer fluid and circulates it through said liquid piping system to provide heat in response to said system module control commands from said processor in order to provide desired protection in response to predetermined environmental conditions.

32. The protection system of claim 23 wherein said heating means further comprises an electric heating system where the external energy source comprises an external electrical heater power source and where said energy supply system further comprises a heater electric supply system such that said electric heating system uses electrical energy to provide heat in response to said system module control commands from said processor in order to provide desired protection in response to predetermined environmental conditions.

33. The protection system of claim 23 wherein said interconnection means further comprises a wired cable system to connect said system module to said sensing means, to connect said system module to said control system means, to connect said system module to said heating means and to connect said system module to said external interface means.

34. The protection system of claim 33 wherein said internal interface means further comprises a local area network device where said local area network device provides communication over said wired cable system between said system module and said sensing means, between said system module and said control system means, between said system module and said heating means and between said system module and said external interface means.

35. The protection system of claim 23 wherein said interconnection means further comprises a wireless system to connect said system module to said sensing means, to connect said system module to said control system means, to connect said system module to said heating means and to connect said system module to said external interface means.

36. The protection system of claim 35 wherein said internal interface means further comprises a wireless local area network device where said wireless local area network device and said wireless system cooperate to provide communication over said wireless system between said system module and said sensing means, between said system module and control system means, between said system module and said heating means and between said system module and the remote sites through said external interface means.

37. The protection system of claim 23 wherein said interconnection means further comprises a wired cable system and a wireless system, where the combination of said wired cable system and said wireless system cooperate to connect said system module to said sensing means, to connect said system module to said control system means, to connect said system module to said heating means and to connect said system module to said external interface means.

38. The protection system of claim 23 wherein said internal interface means further comprises a local area network device and wherein said external interface means further comprises a local area network server where said local area network device and said local area network server cooperate to provide communication over said interconnection means between said system module and said remote sites and where said local area network device provides communication over said interconnection means between said system module and said sensing means, between said system module and said control system means and between said system module and said heating means.

39. The protection system of claim 23 wherein said internal interface means further comprises a wireless local area network device and wherein said external interface means further comprises a wireless local area network router where said wireless local area network device and said wireless local area network router cooperate to provide communication over said interconnection means between said system module and said remotes sites and where said wireless local area network device provides communication over said interconnection means between said system module and said sensing means, between said system module and said control system means and between said system module and said heating means.

40. The protection system of claim 23 wherein said internal interface means further comprises a modem and said interconnecting means further comprises a plurality of wired phone lines where said modem and said wired phone lines cooperate to provide communication between said system module and said sensing means, between said system module and said control system means, between said system module and said heating means and between said system module and said external interface means.

41. A method of operation of an adaptive freeze, snow or ice protection system where freezing conditions, snowing conditions, icing conditions or any combination thereof are environmental conditions that said protection system provides protection from, said protection system being supplied with an external energy source, with an external electrical control power source and with a reliability factor, said protection system comprising a system module, a sensing means, a heating means, a control means, an interconnection means and an external interface means where said system module comprises a processor, an internal interface means and a local memory where local memory having a knowledge file with knowledge file data and a history file with history file data, said protection system having a plurality of predetermined inputs comprising a plurality of predetermined local inputs and a plurality of predetermined remote inputs, said protection system having a plurality of predetermined data comprising a plurality of predetermined local data and a plurality of predetermined remote data, said protection system using a method of operation comprising:
 starting method of operation step,
 setting the reliability factor step, obtaining existing environmental condition from said sensing means step,
comparing existing environmental condition to predetermined environmental conditions step,
obtaining said local data step,
obtaining said local inputs step,
obtaining said remote data step,
obtaining said remote inputs step,
comparing said local inputs and said remote inputs with predetermined environmental conditions, with updated knowledge file and with updated history file step,
performing adaptive analysis step wherein said processor in said protection system performs an adaptive analysis to determine system module control commands using said predetermined inputs and said predetermined data,
providing said predetermined data to update said history file and providing updated history file data for comparison of said local inputs and said remote inputs with predetermined environmental conditions, with updated knowledge file and with updated history file step,
providing said predetermined data to update knowledge file and providing knowledge file data for comparison of said local input and said remote inputs with predetermined environmental conditions step,
sending said system module control commands to said heater means to control the heat produced by said heating means in order to provide desired protection in response to predetermined environmental conditions step,
sending said system module control commands to said control system means so that said control system means can respond to said system module control commands to provide desired protection in response to predetermined environmental conditions step, and
ending and resetting method of operation for next operation step in response to determining that no-match occurred from the comparison of existing environmental condition to predetermined environmental conditions or to the sending of said system module control commands.

42. The method of claim 41 further comprising an obtaining predictive meteorological inputs step, said obtaining predictive meteorological inputs step comes after said comparing existing environmental condition to predetermined environmental conditions step and before said performing adaptive analysis step and before said ending and resetting method of operation for next operation step where said obtaining predictive meteorological inputs step receives the no-match input from the comparing an existing environmental condition to predetermined environmental conditions step and provides a likelihood input to the performing adaptive analysis step and provides a no-likelihood input to the ending and resetting method of operation for next operation step such that if no-match from the comparison of existing environmental condition to predetermined environmental conditions occurs, then predictive meteorological inputs are obtained so that the likelihood of a predetermined environmental condition occurring within a predetermined time is determined,
  where said performing adaptive analysis step further includes the requirement of performing adaptive analysts by said processor to determine said system module control commands in response to the predictive meteorological inputs indicating a likelihood of a predetermined environmental condition occurring within a predetermined time input, and
  where said ending and resetting method of operation for next operation step is in response to determining that there is no likelihood of a predetermined environmental condition occurring within a predetermined time input or to the sending of said system module control commands.

* * * * *